United States Patent
Sasaki et al.

(10) Patent No.: US 7,206,096 B1
(45) Date of Patent: Apr. 17, 2007

(54) RECORDING METHOD AND APPARATUS

(75) Inventors: Yoshiharu Sasaki, Shizuoka (JP);
Mitsuru Sawano, Kanagawa (JP)

(73) Assignee: Fujifilm Corporation, Tokyo (JP)

( * ) Notice: Subject to any disclaimer, the term of this patent is extended or adjusted under 35 U.S.C. 154(b) by 924 days.

(21) Appl. No.: 09/704,724

(22) Filed: Nov. 3, 2000

(30) Foreign Application Priority Data

Nov. 4, 1999 (JP) ................................ 11-313980
Oct. 6, 2000 (JP) ............................. 2000-307917

(51) Int. Cl.
*G06K 15/10* (2006.01)
*H04N 1/60* (2006.01)

(52) U.S. Cl. ........................................ 358/1.8; 358/1.9
(58) Field of Classification Search ................ 358/1.8, 358/1.5, 1.12, 1.18, 1.9, 2.1, 3.1, 3.11, 3.12, 358/1.11; 347/78, 80, 116, 173, 1, 2, 23, 347/24, 115, 117, 172, 174; 374/234, 235, 374/248, 250

See application file for complete search history.

(56) References Cited

U.S. PATENT DOCUMENTS

| | | | | |
|---|---|---|---|---|
| 5,262,937 A | * | 11/1993 | Mackin et al. | 347/232 |
| 5,808,655 A | * | 9/1998 | Haas et al. | 347/234 |
| 5,940,093 A | * | 8/1999 | Bolash et al. | 347/16 |
| 6,191,805 B1 | * | 2/2001 | Shimizu et al. | 347/241 |
| 6,318,830 B1 | * | 11/2001 | Sugishima | 347/12 |
| 6,356,358 B1 | * | 3/2002 | Kakutani et al. | 358/1.7 |
| 6,388,690 B1 | * | 5/2002 | Kurachi | 347/180 |
| 6,695,426 B2 | * | 2/2004 | Herwald et al. | 347/19 |

* cited by examiner

*Primary Examiner*—Dov Popovici
(74) *Attorney, Agent, or Firm*—Sughrue Mion, PLLC

(57) ABSTRACT

A recording method in which, using recording head (40) having a plurality of recording elements, a plurality of colors are recorded on a recording medium with spots formed by the recording elements that are actuated in accordance with the key image information. Recording is performed with the start position with being offset from at least among two colors either upstream or downstream in the sub-scanning direction by an amount of spot(s) in the range from one spot to the number of spots defined such that total number of spots in the sub-scanning direction subtracts one spot.

15 Claims, 22 Drawing Sheets

FIG. 4

| STARTING POSITION PRECEDED BY ONE SPOT | | | | | | | | | | | | | | | | | | | | | |
|---|---|---|---|---|---|---|---|---|---|---|---|---|---|---|---|---|---|---|---|---|
| SUB-SCANNING DIRECTION LINE NO. | 1 | 2 | 3 | 4 | 5 | 6 | 7 | 8 | 9 | 10 | 11 | 12 | 13 | 14 | 15 | 16 | 17 | 18 | 19 | 20 | 21 |
| K-RECORDING SPOT ch NO. | 1 | 2 | 3 | 4 | 5 | 6 | 7 | 8 | 9 | 10 | 11 | 12 | 13 | 14 | 15 | 1 | 2 | 3 | 4 | 5 | 6 |
| C-RECORDING SPOT ch NO. | 15 | 1 | 2 | 3 | 4 | 5 | 6 | 7 | 8 | 9 | 10 | 11 | 12 | 13 | 14 | 15 | 1 | 2 | 3 | 4 | 5 |

100: RECORDING APPRATUS
110: RECORDING DRUM
112: RECORDING MATERIAL
MAIN SCANNING DIRECTION
114: OPTICAL HEAD
SUB-SCANNING DIRECTION
116: MOVING STAGE

LASER BEAM

DRUM SIDE

FIG. 20

RECORDING METHOD AND APPARATUS

BACKGROUND OF THE INVENTION

1. Field of the Invention

This invention relates to a method and an apparatus for recording various forms of information such as imagery and characters. The invention particularly relates to a technology for producing high-quality records using a recording head having a plurality of recording elements.

2. Description of the Related Art

FIG. 16 shows a general layout of a related art recording apparatus comprising a rotating recording drum and a recording head. In the recording apparatus indicated by 100, a generally cylindrical recording drum 110 is rotatably supported on a frame and a recording medium 112 can be fixed onto the outer circumference of the drum 110. The direction in which the drum 100 rotates corresponds to the main scanning direction.

A recording head 114 is fixed on a moving stage 116 such that it is capable of sliding along the guide member of the stage 116. The direction in which the recording head 114 moves along the stage 116 corresponds to an sub-scanning direction. The recording head 114 is typically composed of a plurality of laser diodes (LD) so that it is capable of issuing a plurality of laser beams.

As shown in FIG. 17, the recording medium 112 consists of a colorant or toner sheet 10 and an image-receiving sheet 12. The toner sheet 10 consists of a base 11 coated with a light-heat converting layer 14 and a toner layer 15 on the side which faces the image-receiving sheet. The image-receiving sheet 12 consists of a base 16 coated with a cushion layer 17 and an image-receiving layer 18 on the side which faces the toner sheet.

The base 11 is made of a material that transmits laser beam, as exemplified by PET (polyethylene terephthalate), TAC (triacetyl cellulose) or PEN (polyethylene naphthalate). The light-heat converting layer 14 may be made of carbon, a black substance, an IR absorbing dye, a substance capable of absorbing specific wavelength, or any other substances that are capable of efficient conversion of laser energy to heat. The toner layer 15 is typically for black (K), cyan (C), magenta (M) and yellow (Y) colors and it may be for special colors such as gold, silver, brown, gray and green. In a recording mode, the toner layer 15 is brought into intimate contact with the image-receiving layer 18 in the image-receiving sheet 12 and, upon illumination with laser beams from the recording head 114, it is heated to have the toner image transferred to the image-receiving layer 18 in the image-receiving sheet 12.

The base 16 may be the same as the base 11 of the toner sheet 10 or it may be a light-opaque base. In a recording mode, the image-receiving layer 18 is brought into intimate contact with the toner layer 15 in the toner sheet 10 and the heated areas of the toner layer 15 are transferred to the image-receiving layer 18. When transfer is made from a plurality of toner sheets 10 in superposition, the cushion layer 17 effectively absorbs the difference in toner size.

FIG. 18 shows the steps in a process of forming a color image consisting of K, C, M and Y colors. Lamination, if performed at all, precedes laser recording for each color.

1) The image-receiving sheet 12 is wrapped onto the outer circumference of the recording drum.

2) A K toner sheet 10 is wrapped onto the image-receiving sheet 12.

3) Laser beams are applied in accordance with the data for K imagery and characters so that a record in K color is formed on the image-receiving sheet 12.

4) The K toner sheet 10 is stripped from the image-receiving sheet 12.

5) A C toner sheet is wrapped onto the image-receiving sheet 12.

6) Laser beams are applied in accordance with the data for C imagery and characters so that a record in C color is formed on the image-receiving sheet 12.

7) The C toner sheet is stripped from the image-receiving sheet 12.

8) A M toner sheet is wrapped onto the image-receiving sheet 12.

9) Laser beams are applied in accordance with the data for M imagery and characters so that a record in M color is formed on the image-receiving sheet 12.

10) The M toner sheet is stripped from the image-receiving sheet 12.

11) A Y toner sheet is wrapped onto the image-receiving sheet 12.

12) Laser beams are applied in accordance with the data for Y imagery and characters so that a record in Y color is formed on the image-receiving sheet 12.

13) The Y toner sheet is stripped from the image-receiving sheet 12.

14) As the result of steps 1)–13), K, C, M and Y colors are formed in a predetermined pattern of superposition to produce the desired color image.

15) The color image is then transferred to a final recording sheet.

When lamination is to be performed with a view to assuring better adhesion in records, the thermal transfer sheet is compressed under a pressure roller, a heated roller or the like just before recording each color with laser and this allows the thermal transfer sheet to be brought into intimate contact with the image-receiving sheet.

To perform laser recording in the manner described above, laser beam spots are arranged as typically shown in FIG. 19. The pattern shown in FIG. 19 consists of three columns of spots in the main scanning direction and five rows of spots in the sub-scanning direction, totaling to 15 spots (spot No. 1 to spot No. 15).

This arrangement of spots is herein called "a basic spot arrangement". The spot in the first column as counted from the right end and which is in the first row as counted from the bottom is called the first spot; the other spots in the first column are called the second spot, the third spot, the fourth spot and so forth. The basic spot arrangement as used herein is such that even if no recording elements are mounted in the respective spot positions, the individual spots are assigned numbers according to the system just described above. When recording is done by flashing all laser beam spots simultaneously in the main scanning direction according to the basic spot arrangement, a solid image is formed as shown in FIG. 20, in which the recorded areas are hatched.

In the case of recording with a plurality of spots with toner sheets of different colors being superposed sequentially on the image-receiving sheet on the recording drum, the same spot channel is used for the same place (i.e., the same recording line in the sub-scanning direction). In the case of K color shown in FIG. 21, the line number in the sub-scanning line coincides with the spot channel number and this is also true with the case of C color shown in FIG. 22, as well as with Y and M colors.

However, if all spots are fired simultaneously to record the solid image shown in FIG. 20, the outside of the two-dimensional spot array is greatly influenced by the surrounding ambient temperature and the spot positions at both ends are comparatively cooler than the inside spot positions. To be more specific, every inside spot position that is located between adjacent spots is hotter than the surrounding ambient temperature and, hence, hotter than the spot positions at both ends. This means that the lines recorded with the spots at both ends are comparatively thin whereas the lines recorded with inside spots are comparatively thick. As a result, the recorded image can potentially have a small gap that is created by every rotation of the recording drum as shown in FIG. 23 (to be more exact, at intervals of 15 lines).

A further problem occurs if all spots are fired simultaneously to record the solid image shown in FIG. 20. Exposure first starts at each preceding spot position (channels 1, 6 and 11), so these preceding spots are cooler than the other spot positions (channels 2–5, channels 7–10 and channels 12–15). To be more specific, these other spot positions are hotter than the preceding spot positions on account of the heat from the adjacent channels that first started exposure. In other words, the lines recorded with the preceding spots are comparatively thin and the lines recorded with the other spots are comparatively thick. As a result, the recorded image can potentially have a small gap that is created for every column in the two-dimensional spot array as shown in FIG. 24 (to be more exact, at intervals of 5 lines).

Thus, recording a plurality of colors in the same place (the same recording line in the sub-scanning direction) has the disadvantage of exaggerating the characteristics inherent in channels to such an extent that they are highly visible as image defects. From the viewpoint of spots, the characteristics inherent in channels include power, spot size, spot shape and wavelength and from the viewpoint of recording characteristics, they include line width, jaggedness at line edges and density. Among these, line width is greatly influenced by the characteristics of thin spot channels and thick spot channels. To be more specific, a gap may form between adjacent thin spot channels whereas the image recorded by a thick spot channel may spread to the adjacent channels, with the result that the density intended by the image data is not attained or the dots in the adjacent channels which should be left blank are not actually left blank. In each of these cases, unevenness occurs in the recorded image.

SUMMARY OF THE INVENTION

The present invention has been accomplished under these circumstances and has as an object providing a recording method which prevents the characteristics inherent in channels from being exaggerated and becoming highly visible as image defects, thereby reducing the occurrence of image unevenness that depends on channel arrangement.

Another object of the invention is to provide a recording apparatus for implementing this method.

The first object of the invention can be attained by the recording method, according to a first aspect of the present invention, in which using a recording head having a plurality of recording spots in both a main scanning direction and an sub-scanning direction perpendicular to said main scanning direction, a plurality of colors are recorded on a recording medium with the spots that key image information to the respective recording spots, characterized by performing recording with the start position for recording of each color by the recording head in the sub-scanning direction being offset from at least one color either upstream or downstream in the sub-scanning direction by an amount within the range between one spot and the total number of spots in the sub-scanning direction minus one spot.

In this recording method, with respect to at least one color, the start position for recording another color is offset either upstream or downstream in the sub-scanning direction, so that different spot channels are used in the same place (the same recording line in the sub-scanning direction) to record a plurality of colors. As a result, the characteristics inherent in channels will not duplicate for each color and, hence, will not be exaggerated. As already mentioned, a gap is likely to occur between adjacent spot channels having comparative thin characteristics but according to the recording method described above, such characteristics will not duplicate for each color and the gap will become less visible as an image defect, thus reducing the image unevenness which is dependent on the characteristics of channel arrangement.

The first object of the invention can also be attained by the recording method, according to a second aspect of the present invention, in which using a recording head having a plurality of recording spots in both a main scanning direction and an sub-scanning direction perpendicular to said main scanning direction, a plurality of colors are recorded on a recording medium with the spots that key image information to the respective recording spots, characterized in that the plurality of colors to be recorded are four colors K, C, M, and Y, the start position for recording by the recording head in the sub-scanning direction is offset from at least one color either upstream or downstream in the sub-scanning direction, and the offset is neither by the same amount nor in the same direction for the K, C, M, and Y.

In this recording method, the offset is neither by the same amount nor in the same direction for K, C, M, and Y, so the characteristics inherent in channels will not duplicate in two or more colors and, hence, will not be exaggerated.

The first object of the invention can also be attained by the recording method, according to a third aspect of the present invention, in which using a recording head having a plurality of recording spots arranged in both a main scanning direction and an sub-scanning direction perpendicular to said main scanning direction, a plurality of colors are recorded on a recording medium with spots that key image information to the respective recording spots, characterized in that the plurality of colors to be recorded are K, C, M, and Y, the start position for recording by the recording head in the sub-scanning direction is offset either upstream or downstream in the sub-scanning direction, and the start position for recording any one of the plurality of colors is offset by one spot, the start position for recording a second one of the plurality of colors is offset by two spots, and the start position for recording a third one of the plurality of colors is offset by three spots.

In this recording method, any one of the four colors K, C, M, and Y is offset by one spot, any other of these colors is offset by two spots, and yet another of these colors is offset by three spots and this contributes to minimizing the total offset of all colors. In other words, all colors can be offset from one color by a minimum amount and the image unevenness which depends on the characteristics of channel arrangement can be reduced while reducing the possibility of the occurrence of misregistration.

The first object of the invention can also be attained by the recording method, according to a fourth aspect of the present invention, in which using a recording head having a plurality of recording spots in both a main scanning direction and an sub-scanning direction perpendicular to said main scanning direction, a plurality of colors are recorded on a recording medium with spots that key image information to the respective recording spots, characterized by performing recording such that the start position for recording by the recording head in the sub-scanning head is offset either upstream or downstream in the sub-scanning direction and that the projected spots responsible for recording in correspondence with image data are offset by the same amount in an opposite direction of the start position which is either downstream or upstream in the sub-scanning direction.

In this recording method, the recording start position is offset either upstream or downstream in the sub-scanning direction and, at the same time, the spots responsible for recording in correspondence with image data are offset by the same amount in an opposite direction which is either downstream or upstream in the sub-scanning direction. If the recording start position is offset upstream in the sub-scanning direction, the responsible spots are offset downstream in the sub-scanning direction. If the recording start position is offset downstream in the sub-scanning direction, the responsible spots are offset upstream in the sub-scanning direction. In the first case (the responsible spots are offset downstream in the sub-scanning direction), the spots that are usually recorded with one channel are recorded with two channels. The advantage of this treatment is that if one channel has a low-density characteristic, C color may be offset from K color by one spot to have low density in a different position. Since the image data is offset in a reverse direction by one spot, recording can be made in the initially intended position.

The first object of the invention can also be attained by the recording method, according to a fifth aspect of the present invention, in which using a recording head having a plurality of recording elements arranged in a two-dimensional pattern in both a main scanning direction and an sub-scanning direction perpendicular to said main scanning direction, a plurality of colors are recorded on a recording medium with spots that key image information to the respective recording elements, characterized in that the plurality of colors to be recorded are four colors K, C, M, and Y, the start position for recording by the recording head in the sub-scanning direction is offset either upstream or downstream in the sub-scanning direction, the spots responsible for recording in correspondence with image data are offset by the same amount in an opposite direction which is either downstream or upstream in the sub-scanning direction, and the offset is neither by the same amount nor in the same direction for the colors K, C, M, and Y.

This recording method has the same advantage as the recording method according to the fourth aspect of the invention. In addition, the offset is neither by the same amount nor in the same direction for K, C, M, and Y, so the characteristics inherent in channels will not duplicate in two or more colors.

The second object of the invention can be attained by the recording apparatus, in accordance with a sixth aspect of the present invention, which, by using a recording head having a plurality of recording elements arranged in a two-dimensional pattern in both a main scanning direction and an sub-scanning direction perpendicular to said main scanning direction, records a plurality of colors on a recording medium with spots that key image information to the respective recording elements, characterized in that the recording head implements the recording method as in any one of the first through fifth aspects of the present invention.

This recording apparatus performs recording using the recording head which implements the recording method recited according to any one of the first through fifth aspects of the invention. As a result, with respect to at least one color, the start position for recording another color is offset either upstream or downstream in the sub-scanning direction, so that the characteristics inherent in channels will not duplicate for each color. This enables the recording of less uneven images which are not dependent on the characteristics of channel arrangement.

BRIEF DESCRIPTION OF THE DRAWINGS

The above and other objects and advantages of the present invention will become more apparent by describing in detail preferred embodiments thereof with reference to the accompanying drawings, wherein like reference numerals designate like or corresponding parts throughout the several views, and wherein:

FIG. 4 shows schematically how spots are recorded with the start position for recording C color being offset upstream from K color by one spot in the sub-scanning direction and with the responsible spots being offset by the same amount in an opposite direction which is downstream in the sub-scanning direction;

Figure 20:
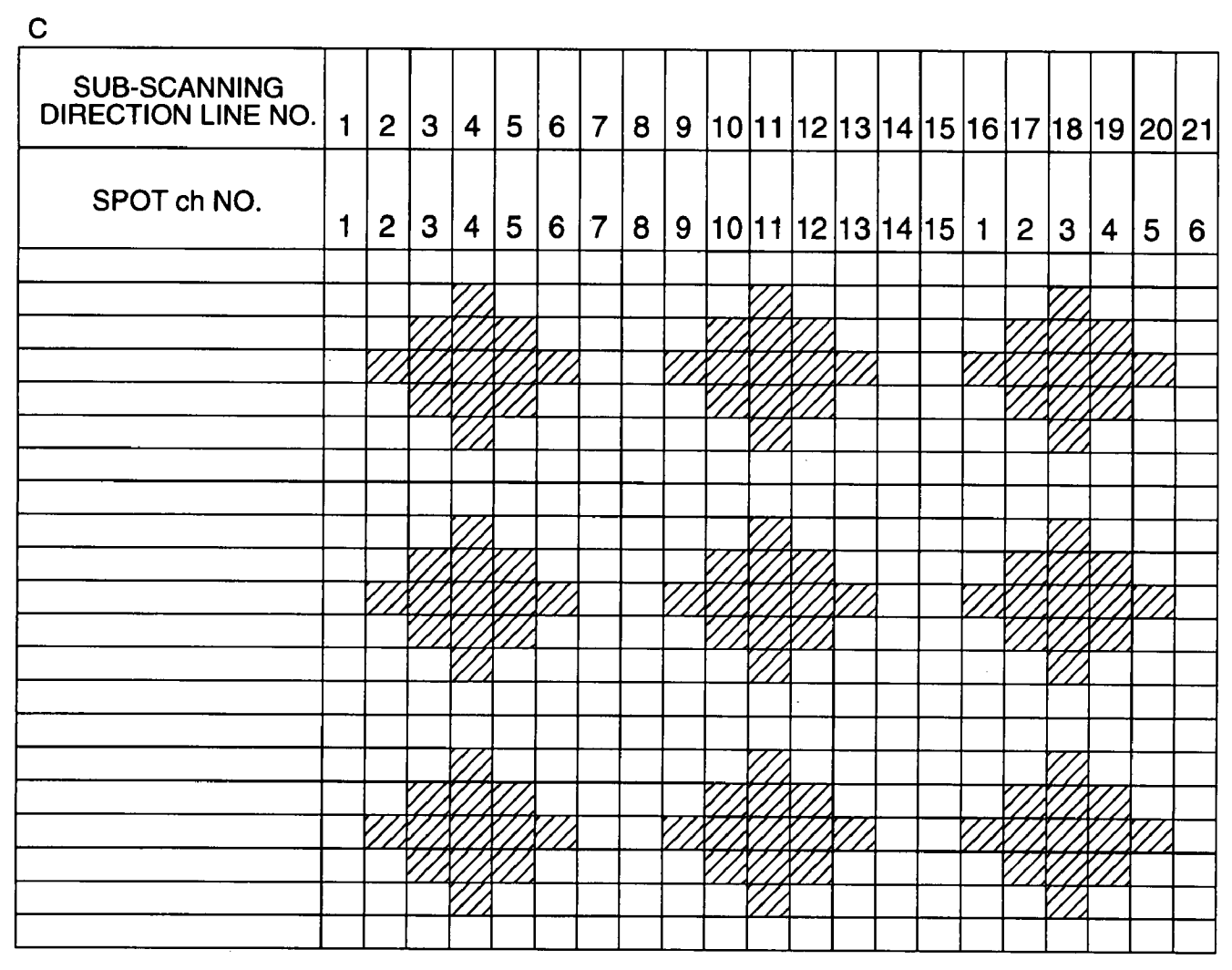

FIG. 20 shows areas as recorded by the arrangement of recording elements shown in FIG. 19;

DETAILED DESCRIPTION OF THE INVENTION

On the pages that follow, the preferred embodiments of the recording method according to the first through fifth aspects of the invention and the recording apparatus according to its sixth aspect are described in detail with reference to the accompanying drawings.

Figure 1:
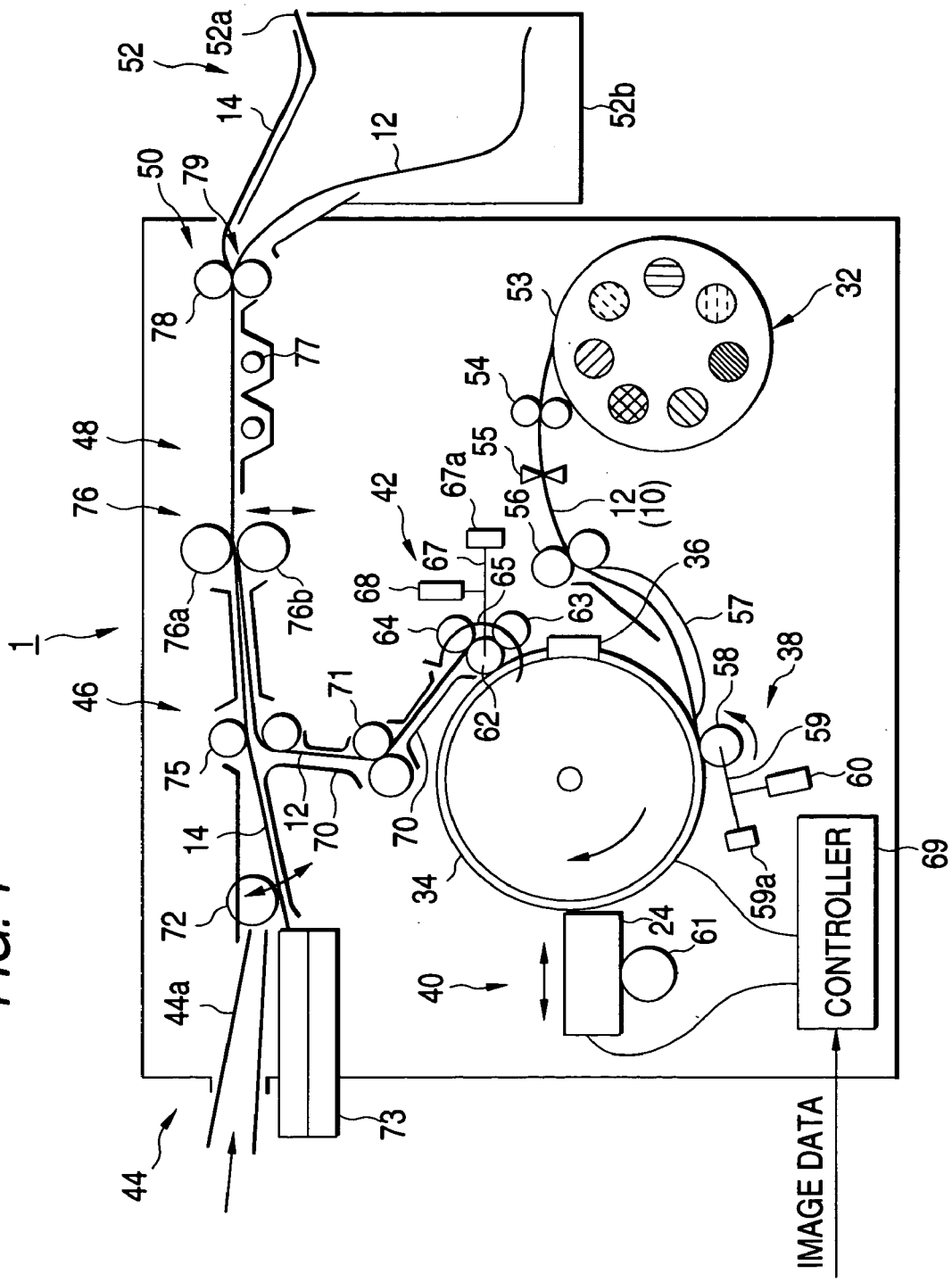
FIG. 1 shows the layout of the recording apparatus according to the second aspect of the invention.
Figure 2:
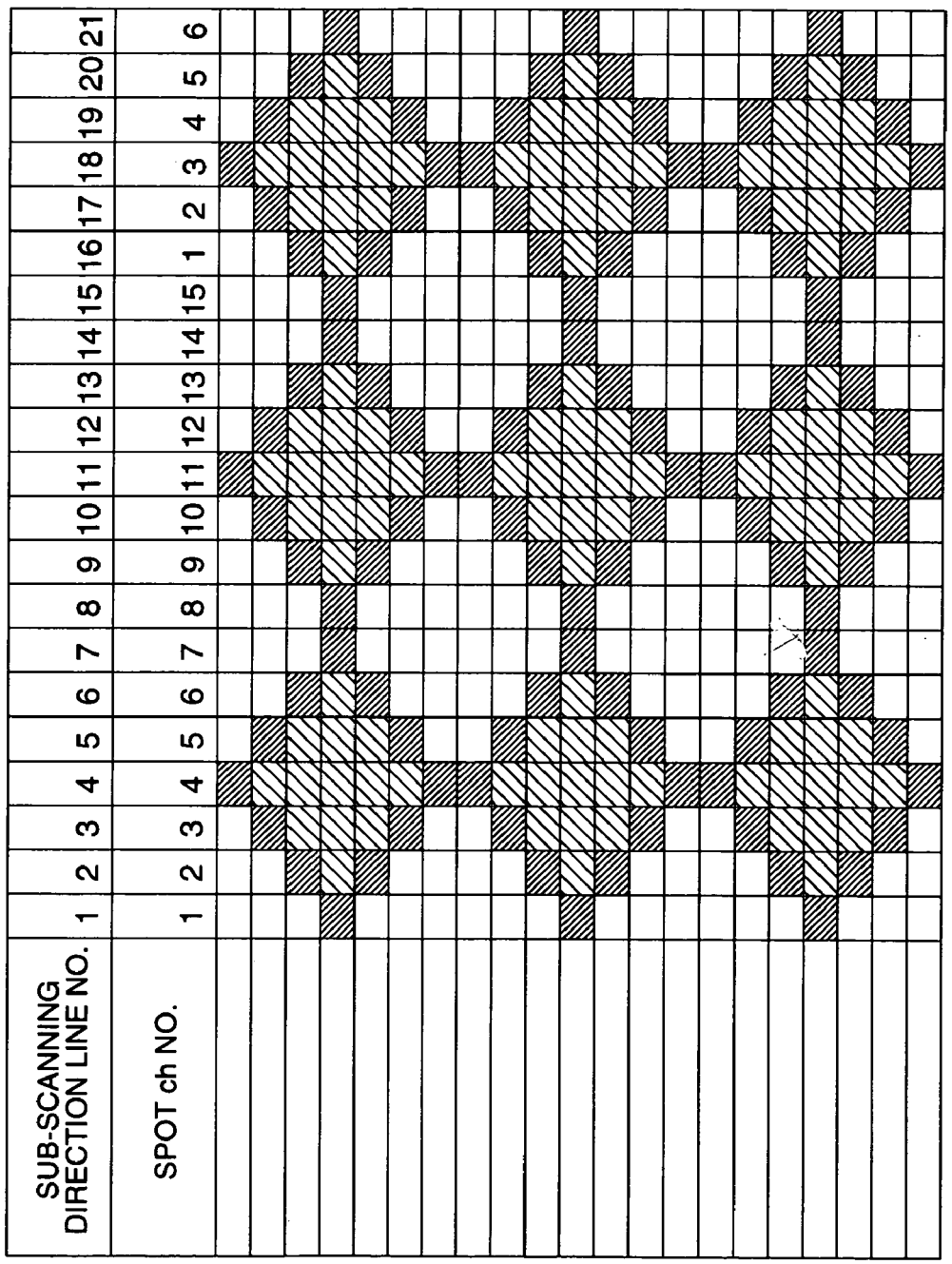
FIG. 2 shows schematically how spots are recorded by bringing the line number in the sub-scanning direction into agreement with the spot channel number.

FIG. 1 shows the layout of the recording apparatus according to the sixth aspect of the invention and FIG. 2 shows schematically how adjacent spots are recorded with the recording apparatus shown in FIG. 1. The recording apparatus generally indicated by 1 is an apparatus for forming full color images and it comprises a recording medium supply section 32, a rotating recording drum 34 for forming images, a recording medium fix/release mechanism 36 provided on the drum 34, a laminating mechanism 38 provided partly along the outer circumference of the drum 34, a recording head 40, a strip mechanism 42, a paper feed section 44, a laminating section 46, a fixing section 48, a strip section 50, a tray section 52, a controller 69 and a motor (not shown) for driving the drum 34.

The operation of the recording apparatus 1 is outlined below. First, the recording medium supply section 32 supplies two recording media, an image-receiving sheet 12 and a colorant (toner) sheet 10, onto the rotating recording drum 34. The image-receiving sheet 12 is then fixed on the drum 34 by means of the recording medium fix/release mechanism 36. The colorant sheet 10 is pressed onto the image-receiving sheet 12 under heating by means of the laminating mechanism 38 so that the colorant sheet 10 is adhesively superposed on the image-receiving sheet 12. The colorant sheet 10 and the image-receiving sheet 12 may advantageously be made of materials capable of thermal transfer with a laser.

Subsequently, the recording head 40 controlled by the controller 69 in accordance with image signals performs imagewise exposure in a heated mode with laser beams being directed toward the colorant sheet 10, whereupon a latent image is recorded on the colorant sheet 10. Then, the colorant sheet 10 is stripped from the image-receiving sheet 12 on the drum 34 by means of the strip mechanism 42 so that the latent image recorded on the colorant sheet 10 is transferred to the image-receiving sheet 12. Upon development, an image is formed on the image-receiving sheet 12.

This procedure is repeated for three to four other colors to form a color image on the image-receiving sheet 12, which then enters the laminating section 46 where it is laminated with a final receiving sheet 14 being supplied from the paper feed section 44. The assembly then enters the fixing section 48, where the image-receiving layer of the image-receiving sheet 12 is photocured. Thereafter, the image-receiving sheet 12 is stripped from the final receiving sheet 14 in the strip section 50. The final receiving sheet 14 bearing the full color image is ejected onto a proof tray 52a and the spent image-receiving sheet 12 is ejected into a waste stacker 52b. The full color image is thus obtained as a hard copy.

The individual sections of the recording apparatus 1 are now described in detail.

The recording medium supply section 32 consists of the following components: a recording medium station 53 holding rolls of heat-sensitive materials (recording media) such as a roll of image-receiving sheet 12 and rolls of colorant sheets 10 such as standard K, C, M and Y toner sheets and sheets of special colors commonly used in the printing industry; a pair of draw-out rollers 54 that can draw out one recording medium; a cutter 55 with which the recording medium the rollers 54 have drawn out of the station 53 by a specified length is cut to sheeting; a pair of rollers 56 for holding and transporting the sheet of recording medium; and a guide 57 that guides the sheet of recording medium onto the drum 34 such that the front end of the recording medium is guided to the fixing position in the recording medium fix/release mechanism 36 mounted on the drum 34.

The image-receiving sheet 12 is the first recording medium that is supplied to the image forming drum 34. The front end of the image-receiving sheet 12 is clamped or otherwise fixed to the recording medium fix/release mechanism 36. As the drum 34 rotates in the direction indicated by the arrow, the image-receiving sheet 12 is wound up along the outer circumference of the drum 34 and its rear end is also fixed by the mechanism 36. Preferably, either the area of the mechanism 36 which fixes the front end of the image-receiving sheet 12 or the area which fixes its rear end or both areas are adapted to be slidable along the outer circumference of the drum 34 so that sheets of recording medium in varying length can be fixed onto the drum 34.

Subsequently, the colorant sheet 10 being transported from the recording medium supply section 32 is wound onto the image-receiving sheet 12 in entirely the same manner as the latter was wound onto the drum 34. The colorant sheet 10 can be superposed on the image-receiving sheet 12 by means of the laminating mechanism 38 which consists of a laminator roller 58 having a built-in heater (not shown), an arm 59 that allows the laminator roller 58 to pivot about a fulcrum 59a so that it contacts or departs from the outer circumference of the drum 34, and an urging means 60 that urges the laminator roller 58 onto the outer circumference of the drum 34 under a specified pressure.

The urging means 60 may be an energizing means such as a spring or it may be an air cylinder's manipulator. Since the image-receiving layer on the outermost surface of the image-receiving sheet 12 is sticky, it can be laminated with the colorant sheet 10 which is wrapped onto it under the specified pressure being exerted by the laminator roller 58. This not only eliminates the development of wrinkles and any other surface defects in the colorant sheet 10 but also permits the image-receiving layer of the image-receiving sheet 12 to be bonded to the colorant layer of the colorant sheet 10 under a uniform adhesive force.

In the case under consideration, the colorant sheet 10 is laminated to the image-receiving sheet 12 by means of the laminator roller 58 which is urged at a sufficient pressure to achieve uniform and strong bonding. In a preferred mode, the laminator roller 58 is not only urged but also heated in order to provide a greater adhesive force.

In the illustrated case, the laminator roller 58 is used to press the colorant sheet 10 into superposition on the image-receiving sheet 12. Any other means that is capable of pressing the colorant sheet 10 into superposition on the image-receiving sheet 12 may be substituted, as exemplified by a rod-shaped pressing member having a smooth end.

When the image-receiving sheet 12 is wound onto the rotating recording drum 34, it is preferred that the front end of the sheet is fixed by the recording medium fix/release mechanism 36 while the other portions of the sheet are held by the transport roller pair 56 or the laminator roller 58 or any other suitable means so that the sheet 12 is wrapped around the outer circumference of the drum 34 under a specified tension. If desired, the outer circumference of the drum 34 may be perforated so that the sheet 12 can be sucked to be fixed in position by a suction means such as a vacuum aspirator. The suction means and the recording medium fix/release mechanism 36 are preferably used in combination but only one of them may be used. In either way, the image-receiving sheet 12 can be fixed to the outer circumference of the recording drum 34 without developing wrinkles or any other surface defects and without causing positional offsets.

The colorant sheet 10 is preferably placed under tension when it is superposed on the image-receiving sheet 12. As in the case of wrapping the image-receiving sheet 12 onto the recording drum 34, the front end and/or rear end of the colorant sheet 10 may be fixed by the recording medium fix/release mechanism 36 which is optionally used in combination with the above-mentioned suction means. The tension to be applied to the colorant sheet 10 during lamination is preferably set at a smaller value than the tension that is applied to the image-receiving sheet 12 when it is wound onto the recording drum 34.

The two main components of the recording head 40 are a laser head 24 that includes a modulation means and which comprises a laser light source (not shown) for emitting light of high-density energy such as laser beams and an imaging lens for adjusting the diameter of laser beam spots and an sub-scanning means 61 that performs sub-scanning by moving the laser head 24 in a direction parallel to the axis of the recording drum 34. As the recording drum 34 rotates, the colorant sheet 10 undergoes main scanning with laser light.

Instead of providing the recording head 40 with the sub-scanning means 61, the recording drum 34 may be equipped with an axially moving means so that it is rotated for main scanning and moved axially for sub-scanning. Details of the recording head 40 in the recording apparatus according to the second aspect of the invention will be given later in this specification. Suffice it here to say that this recording head is of a multi-spot configuration that is capable of emitting a plurality of laser beams and which is composed of a two-dimensional array of laser diode (LD) devices serving as recording elements.

Any laser light sources may be used as long as they can emit light of high-density energy capable of exposure in a heated mode and they include gas lasers such as an argon ion laser, a helium neon laser and a helium cadmium laser, solid lasers such as a YAG laser, semiconductor lasers, as well as dye lasers and excimer lasers. The laser light to be used for image recording in the present invention may be the emission which is either direct from these lasers or passed through a second harmonic generating device to be halved in wavelength.

A suitable laser is chosen from the above list in accordance with the wavelength at which the colorant sheet 10 is sensitive to laser light, its sensitivity and the required recording speed. Semiconductor lasers are the most preferred from the viewpoints of cost, power, size, ease of modulation and so forth. Modulation of laser light in accordance with image signals can be performed by any known techniques; in the case of an argon ion laser, the laser beams may be passed through an external modulator; in the case of a semiconductor laser, the current to be injected into the laser may be controlled (directly modulated) by the image signals. The size of the laser beam spots to be focused on the light-heat converting layer and the scan speed are set in accordance with the required image resolution, the sensitivity of the recording material, and so forth. For printing applications, high resolution is generally required and the beam spots are preferably small from the viewpoint of image quality; on the other hand, the latitude in depth of focus decreases to such an extent that it cannot be easily controlled by mechanical means.

If the scan speed is unduly small, heat loss from the conduction of heat to the base of the colorant sheet 10 and the like increases and this not only lowers the energy efficiency but also prolongs the recording time. Considering these factors, the beam spot diameter on the light-heat converting layer ranges from 5 to 50 µm, preferably from 6 to 30 µm, and the scan speed is at least 1 m/sec, preferably at least 3 m/sec.

The image signals are supplied from an image reader which is external to the recording apparatus 1 of the invention or from or a workstation (W/S) having DTP capabilities, an electronic publishing system or various kinds of storage media (e.g. magnetic tape, floppy disk, hard disk and RAM card); the supplied image signals have the color space and other variables matched by a color management system (color image reproducing system) or the like and thence transmitted to the controller 69 as digital signals via SCSI (small computer system interface); after receiving the necessary processing schemes in the controller 69, the digital image signals are transmitted to the recording head 40 to control the exposure with the laser head 24 in a heated mode.

The controller 69 controls not only the auxiliary scan by the sub-scanning means 61 in the recording head 40 but also the main scan accompanying the rotation of the recording drum 34; at the same time, the controller 69 controls the various parts of the recording apparatus 1, as well as its overall sequence.

The strip mechanism 42 has dual functions; the colorant sheet 10 having a latent image formed on it as the result of exposure with the recording head 40 in a heated mode is stripped from the image-receiving sheet 12; at the same time, the latent image on the colorant sheet 10 is stripped and transferred to the image-receiving sheet 12 for subsequent development. To perform these functions, the strip mechanism 42 has a strip roller 62, two segmented rollers 63 and 64 in contact with the strip roller 62, a comb-shaped guide plate 65 provided between the segmented rollers 63 and 64 to extend along the strip roller 62, and a bracket (not shown) on which these components are mounted altogether.

The strip roller 62 is axially supported by an arm 67 so that it pivots about a fulcrum 67a to either approach or depart from the recording drum 36. It is also equipped with an urging means 68 by which the strip roller 62 presses the laminated assembly of the image-receiving sheet 12 and the colorant sheet 10 on the drum 34 via the arm 67.

By exposure in a heated mode, thermal energy is applied to the colorant sheet 10 imagewise to lower the adhesion of the colorant layer, whereupon a latent image is formed on the colorant sheet 10. When the arm 67 pivots about the fulcrum 67a such that the bracket approaches the laminated assembly of the colorant sheet 10 and the image-receiving sheet 12 having the image-receiving layer to which the colorant sheet 10 is bonded, the comb-shaped guide plate 65 is inserted into the assembly between the image-receiving layer of the image-receiving sheet 12 and the colorant layer of the colorant sheet 10 and at the same time the colorant sheet side of the assembly is depressed by the strip roller 62.

If the joining ends of the colorant sheet 10 and the image-receiving sheet 12 are offset, the comb-shaped guide plate 65 can be easily inserted between the two sheets. Subsequently, the recording drum 34, as well as the strip roller 62 and segmented rollers 63 and 64 are rotated so that the front end of the colorant sheet 10 is moved along the comb-shaped guide plate 65 to be nipped between the strip roller 62 and the segmented roller 63.

Then, the colorant sheet being urged by the strip roller 62 is held and transported between the stripper roller 62 and each of the segmented rollers 63 and 64 and stripped from the image-receiving sheet 12. Since the area of the colorant sheet 10 being urged by the strip roller 62 can be stripped at a constant speed, the force by which it is stripped can be held constant and no vibratory phenomena such as stick/slip will occur, eliminating the chance of uneven stripping.

Since the force that is exerted on the image-receiving sheet 12 to strip the colorant sheet 10 will not vary during the stripping process, there is no possibility for an offset to occur in the position where the image-receiving sheet 12 is fixed on the recording drum 34. This eliminates the chance of a drop in positional precision and produces a monochromatic halftone image having high quality, resolution and contrast but which has not suffered any unwanted defects such as uneven stripping and positional offsets.

The same procedure is repeated for K, C, M and Y colors to produce images of these four colors which are brought into exact registry, stripped, transferred and developed. The image-receiving sheet 12 bearing these images is guided by two guide members 70 and transported by a transport roller pair 71 to enter the laminating section 46. In synchronism with the transport of the image-receiving sheet 12, a final receiving sheet supply roll 72 delivers a final receiving sheet 14 from a cassette 73 into the laminating section 46, in which the final receiving sheet 14 is guided by the guide member 70 and further transported to the right in FIG. 1. If desired, the final receiving sheet 14 may be fed to the supply roll 72 via a hand feed port 44a. Subsequently, the image-receiving sheet 12 and the final receiving sheet 14 are passed between a pair of register rollers 75 so that they are brought into superposition and thence transported into the fixing section 48.

In the fixing section 48, the assembly of the image-receiving sheet 12 and the final receiving sheet 14 is held and transported between a compressing roller 76a and a heating roller 76b so that the image is fixed under heating. The assembly then passes over post-exposure lamps 77 such as UV lamps so that the image-receiving layer of the image-receiving sheet 12 cures to become readily strippable.

In the stripping section 50, the image-receiving layer that has cured to become readily strippable is stripped from the other part of the image-receiving sheet 12 by means of a strip roller pair 78 and a strip guide 79 and then pasted to the final receiving sheet 14 so that the image is transferred thereto. The final receiving sheet 14 bearing the transferred image is ejected as a hard copy onto the proof tray 52a in the tray section 52 whereas the image-receiving sheet 12 having no image-receiving layer is dumped into the waste tray 52b.

To recording information, the recording head 40 turns on and off the modulation of the issued laser beams in accordance with the recording data and it moves in the sub-scanning direction B to heat the colorant sheet 10 on the rotating recording drum 34.

Figure 3:
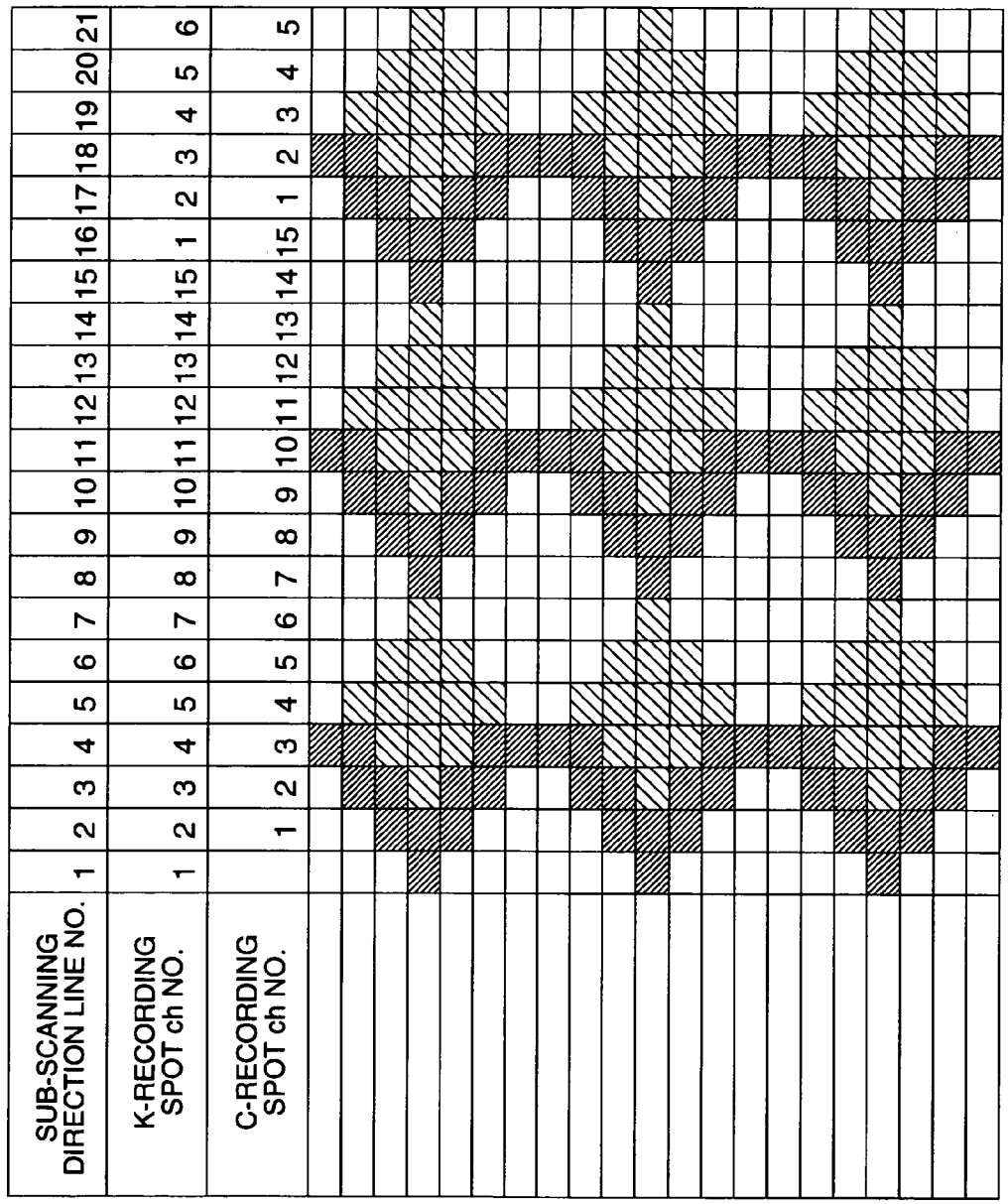
FIG. 3 shows schematically how spots are recorded with the start position for recording C color being offset from K color by one spot upstream in the sub-scanning direction.

FIG. 2 shows schematically how spots are recorded by conforming the line number in the sub-scanning direction with the spot channel number and FIG. 3 shows schematically how spots are recorded with the start position for recording C color being offset from K color by one spot upstream in the sub-scanning direction.

The recording head 40 has a plurality of recording elements arranged in a two-dimensional pattern in both a main scanning direction and an sub-scanning direction perpendicular to the main scanning direction and a plurality of colors are recorded on a recording medium with spots (responsible spots) that key the image information for the colors to the respective recording elements. As FIG. 2 shows, the conventional recording head starts recording spots of C color (lightly shaded in FIG. 2) relative to spots of K color (densely shaded in FIG. 2) by bringing the line number in the sub-scanning direction into agreement with the spot channel number and this has caused inconveniences due to the exaggeration of the above-described characteristics inherent in channels.

According to the recording method of the embodiment under consideration, recording is performed with the start position for recording each color by the recording head 40 in the sub-scanning direction being offset from at least among two colors either upstream or downstream in the sub-scanning direction. Taking K and C colors as examples, the start position for recording C color may be offset from K color by one spot downstream in the sub-scanning direction, as shown in FIG. 3.

Figure 19:
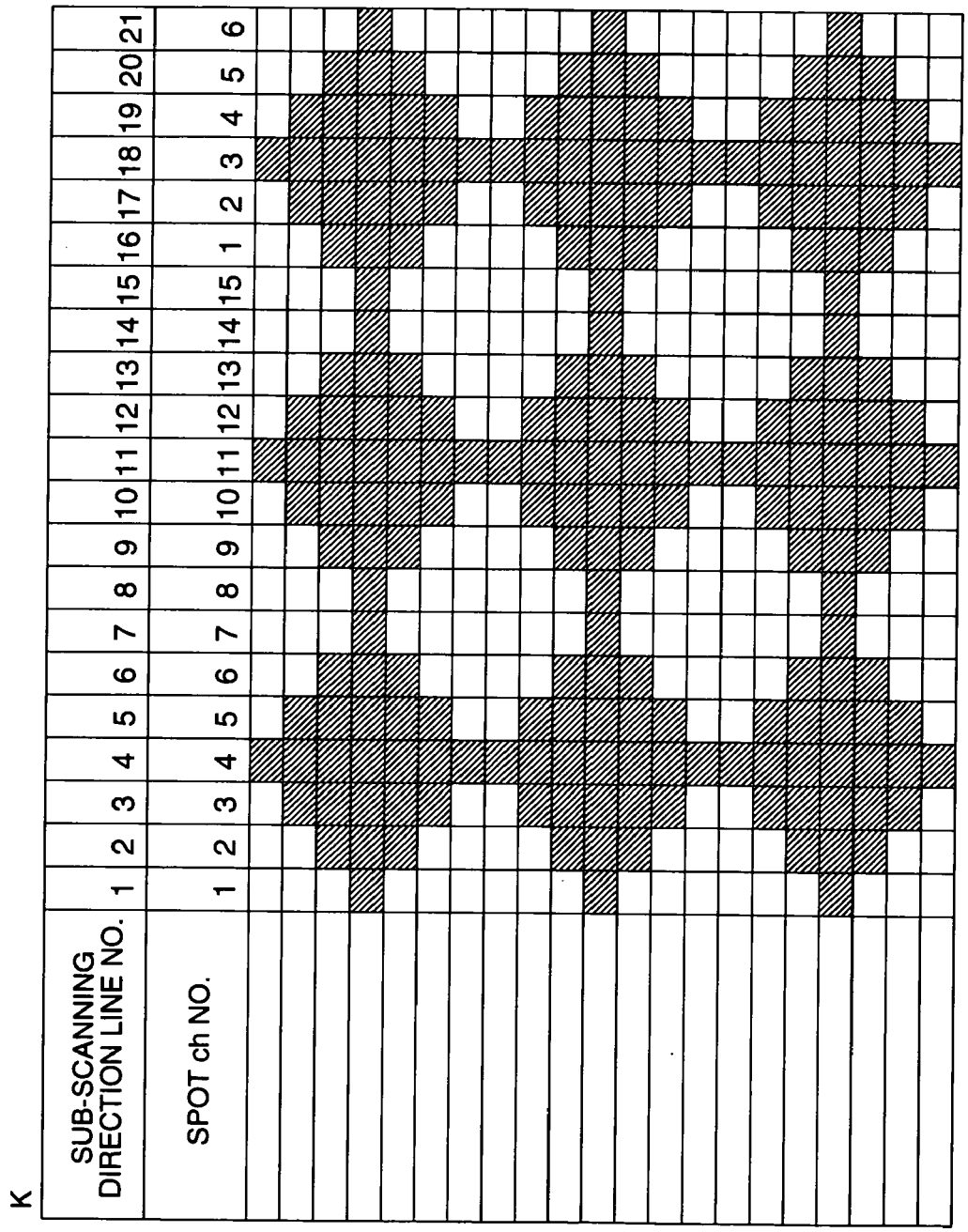
FIG. 19 shows in conceptual form the arrangement of recording elements.
Figure 21:
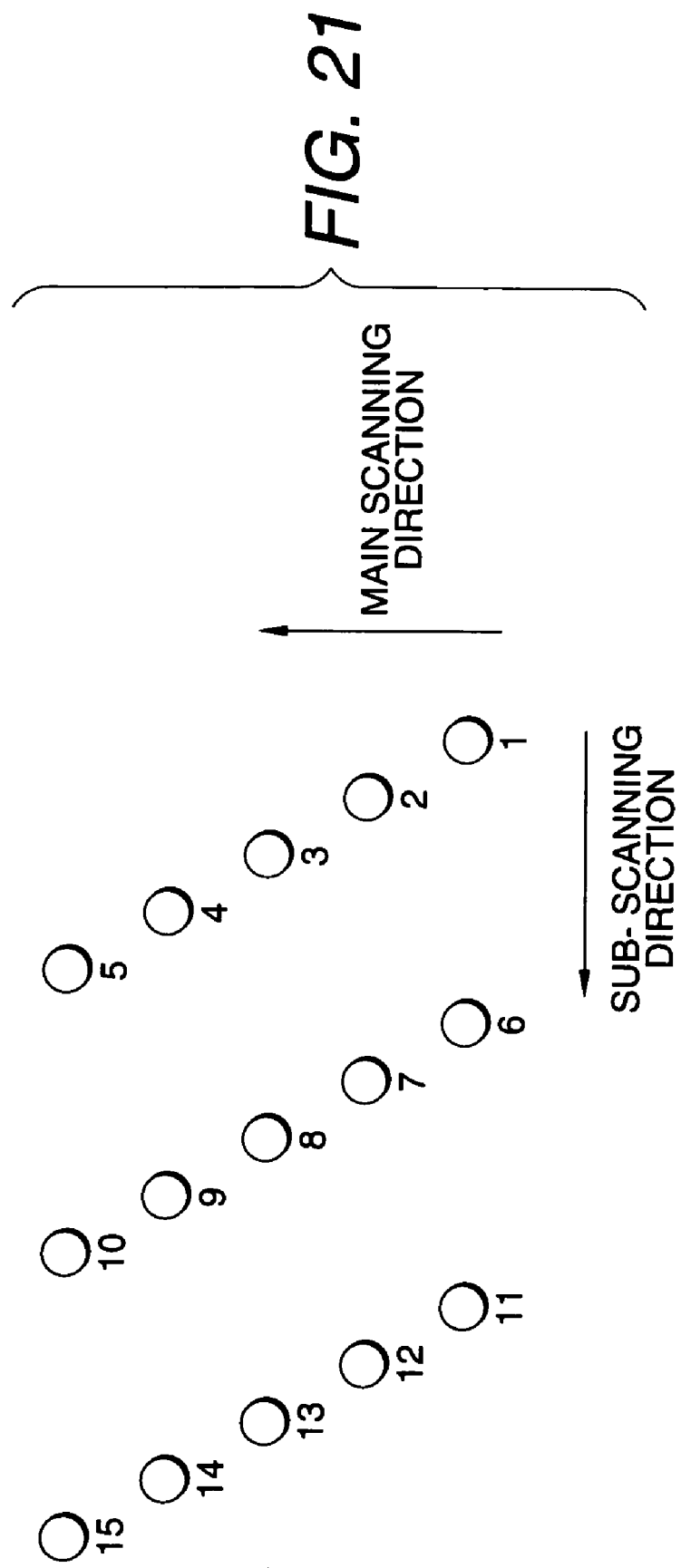
FIG. 21 shows schematically how spots of K color are recorded by bringing the line number in the sub-scanning direction into agreement with the spot channel number.
Figure 22:
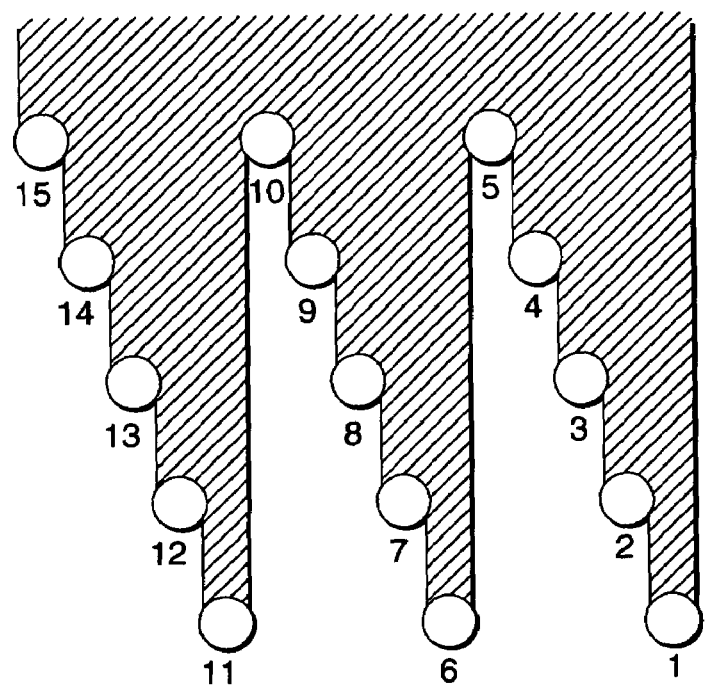
FIG. 22 shows schematically how spots of C color are recorded by bringing the line number in the sub-scanning direction into agreement with the spot channel number.
Figure 23:
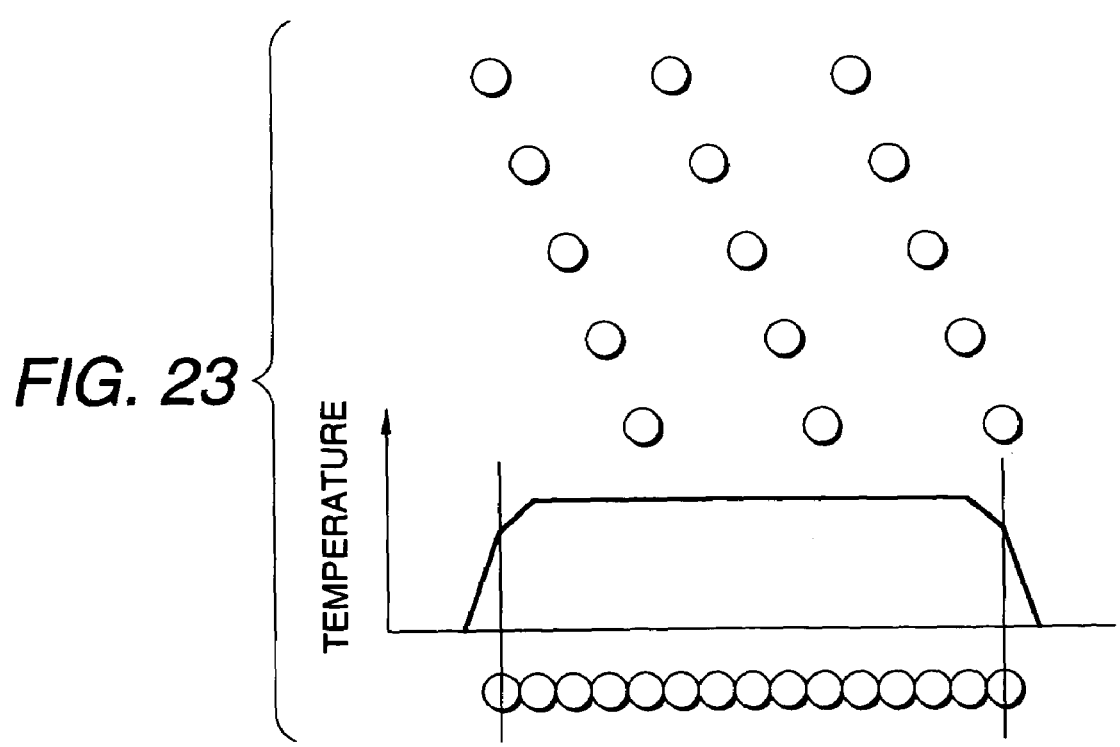
FIG. 23 illustrates how temperature changes cyclically per revolution of a recording drum in the conventional recording method.
Figure 24:
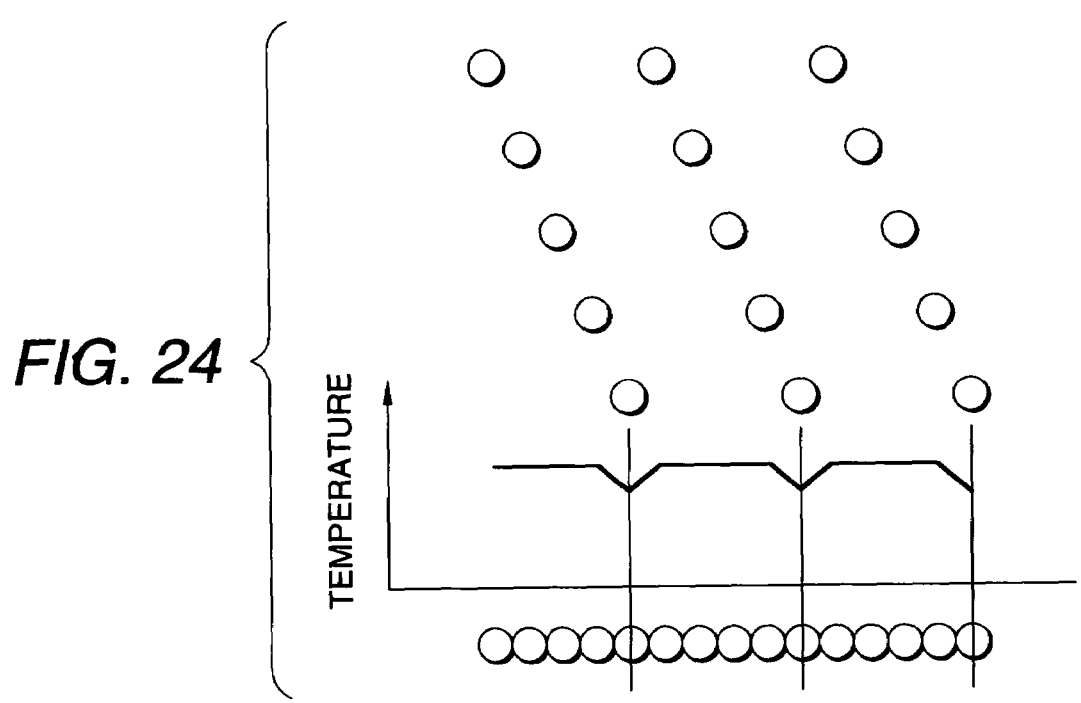
FIG. 24 illustrates how temperature changes cyclically between columns of spots in the conventional recording method.

While FIG. 3 shows the case of offsetting the recording start position by one spot, it should be noted that the amount of offset can be varied within the range between one spot and the total number of spots in the sub-scanning direction minus one spot, or between one spot and the total number of spots in the main scanning direction minus one spot. In the case of a spot arrangement consisting of 3 columns and 5 rows as typically shown in FIG. 19, the amount of offset is substantially in the range between 1 and 14 (=15−1) or between 1 and 4 (=the number of spots in a column minus 1).

In this recording method, with respect to at least among two colors, the start position for recording another color is offset either upstream or downstream in the sub-scanning direction, so that different spot channels are used in the same place (the same recording line in the sub-scanning direction) to record a plurality of colors. As a result, the characteristics inherent in channels will not duplicate for each color and, hence, will not be exaggerated. As already mentioned, a gap is likely to occur between adjacent spot channels having comparative thin characteristics but according to the recording method described above, such characteristics will not duplicate for each other and the gap will become less visible as an image defect, thus reducing the image unevenness which is dependent on the characteristics of channel arrangement.

For recording in four colors K, C, M, and Y, the start position for recording by the recording head 40 in the sub-scanning direction is preferably offset to be differed from each other in K, C, M, and Y colors. As a result, the characteristics inherent in channels will not duplicate in two or more colors and, hence, will not be exaggerated.

If the recording method of the embodiment under consideration is adopted, the offset of spots causes a second and subsequent colors to be recorded in different places than are dictated by image data, eventually causing a phenomenon commonly called "misregistration". This phenomenon, however, is within a tolerable range if the amount of offset is no more than 50 μm.

We next describe a second embodiment of the recording method according to the second aspect of the invention.

The recording method of the second embodiment is characterized in that when four colors K, C, M, and Y are to be recorded, the start position for recording the first recording color is offset substantially by one spot in the sub-scanning direction, the start position for recording any one of other colors is offset substantially by two spots, and the start position for recording yet another color is offset substantially by three spots.

In this recording method, the first color selected from the four colors K, C, M, and Y is offset substantially by one spot, any one of other colors is offset substantially by two spots, and yet another color is offset substantially by three spots and this contributes to minimizing the total offset of all colors. In other words, all colors can be offset from one another by a minimum amount so that the image unevenness which depends on the characteristics of channel arrangement can be reduced while reducing the possibility of the occurrence of misregistration.

The following are specific data for the maximum amount of offset by three spots.

| Resolution (dpi) | Maximum offset (three spots' offset) (μm) |
| --- | --- |
| 2400 | 31.8 |
| 2438 | 31.3 |
| 2540 | 30.0 |
| 5000 | 15.2 |

The values of maximum amount of offset, three spots' offset, are well below 50 μm and, hence, are tolerable.

We next describe a third embodiment of the recording method according to the third aspect of the invention.

FIG. 4 shows schematically how spots are recorded with the start position for recording C color being offset from K color by one spot upstream in the sub-scanning direction and with the responsible spots being offset by the same amount in an opposite direction which is downstream in the sub-scanning direction.

The recording method of the third embodiment is characterized by performing recording such that the start position for recording by the recording head 40 in the sub-scanning head is offset either upstream or downstream in the sub-scanning direction and that the responsible spots are offset by the same amount in an opposite direction which is either downstream or upstream in the sub-scanning direction.

In this recording method, the recording start position is offset either upstream or downstream in the sub-scanning direction and, at the same time, the spots responsible for recording in correspondence with image data are offset by the same amount in an opposite direction which is either downstream or upstream in the sub-scanning direction. Consider, for example, the case where the recording start position is offset upstream in the sub-scanning direction; then, the responsible spots are offset downstream in the sub-scanning direction. If the recording start position is offset downstream in the sub-scanning direction, the responsible spots are offset upstream in the sub-scanning direction.

In the first case (the responsible spots are offset downstream in the sub-scanning direction), the spots that are usually recorded with one channel are recorded with two channels. The advantage of this treatment is that if one channel has a low-density characteristic, C color may be offset from color K by one spot to have low density in a different position. Since the image data is offset in a reverse direction by one spot, recording can be made in the initially intended position.

As in the recording method of the second embodiment, the offset to be introduced in the third embodiment is neither by the same amount nor in the same direction for the four colors K, C, M, and Y. Since the offset is performed in different amount and/or in different direction for the colors K, C, M, and Y, the characteristics inherent in channels will not duplicate in two or more colors.

Figure 5:
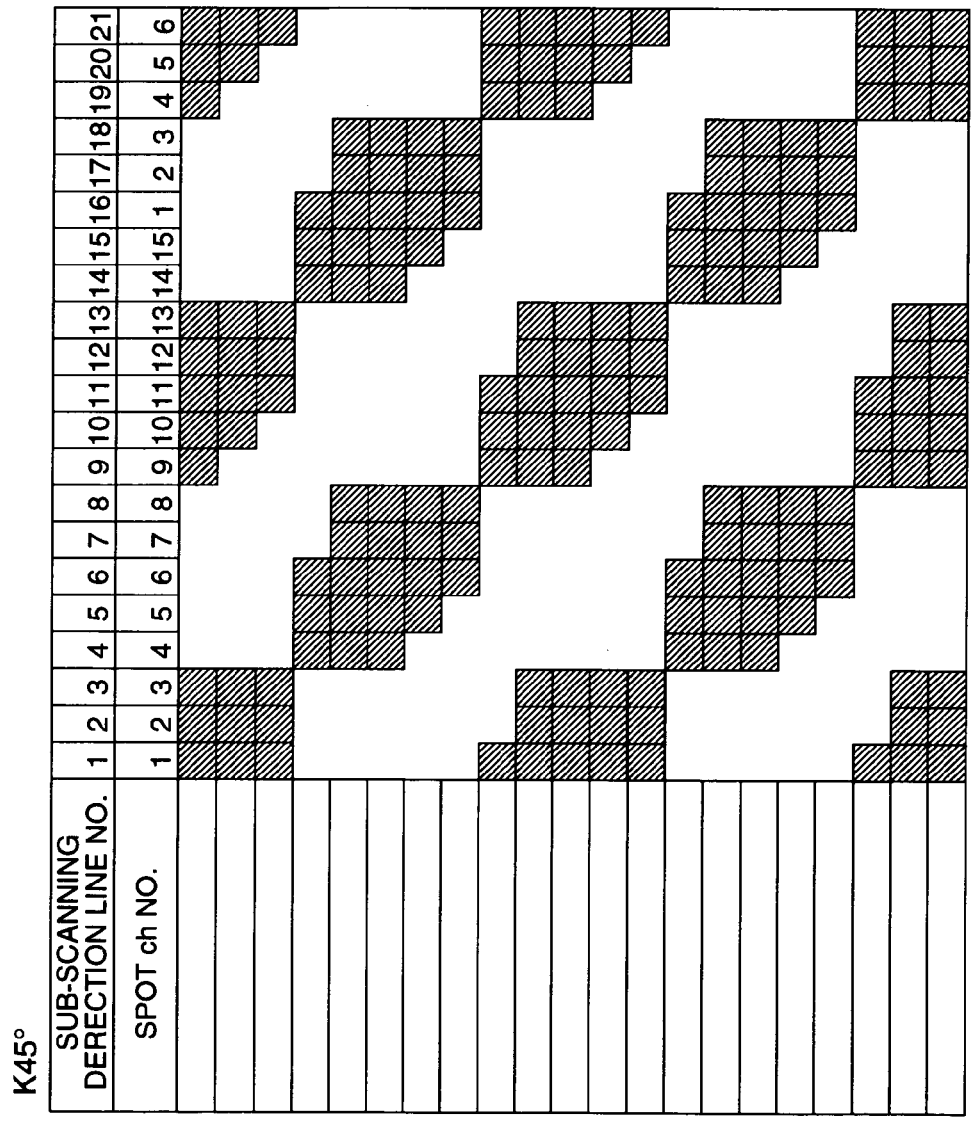
FIG. 5 shows schematically how spots of K color are recorded at a screen angle of 45° by bringing the line number in the sub-scanning direction into agreement with the spot channel number.
Figure 6:
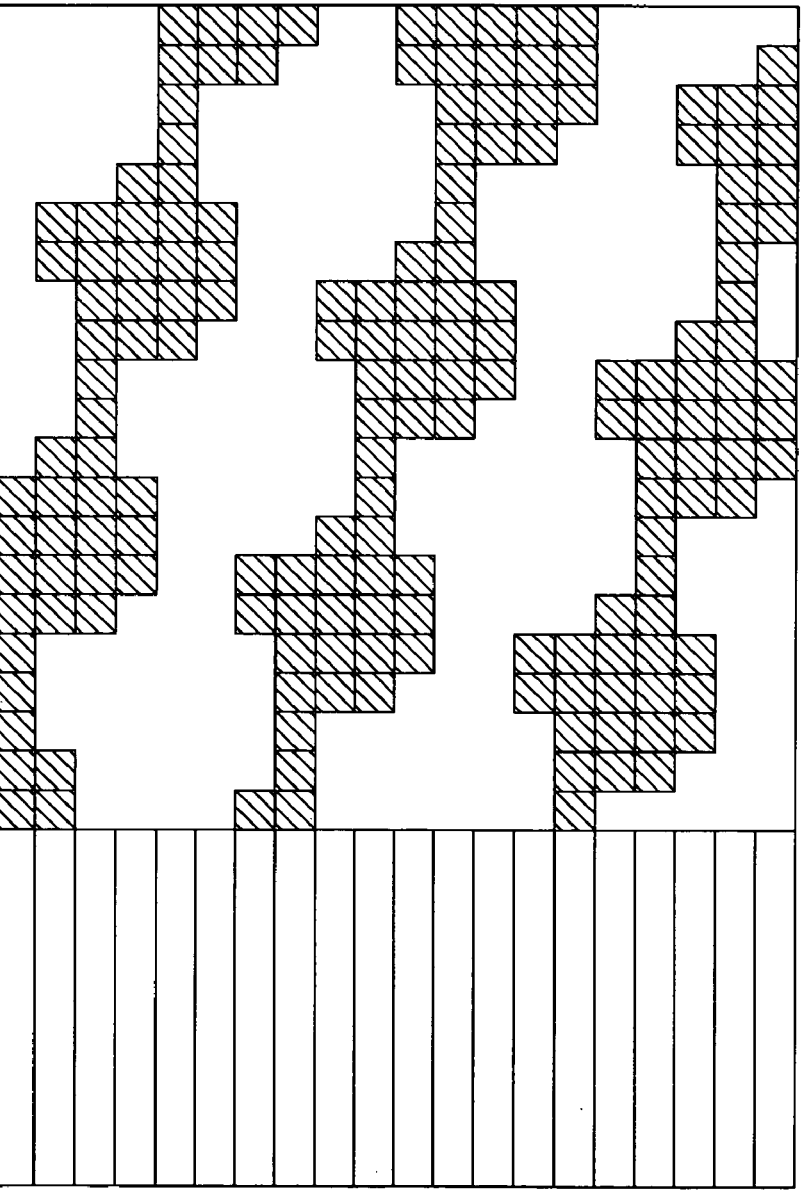
FIG. 6 shows schematically how spots of C color are recorded at a screen angle of 15° by bringing the line number in the sub-scanning direction into agreement with the spot channel number.
Figure 7:
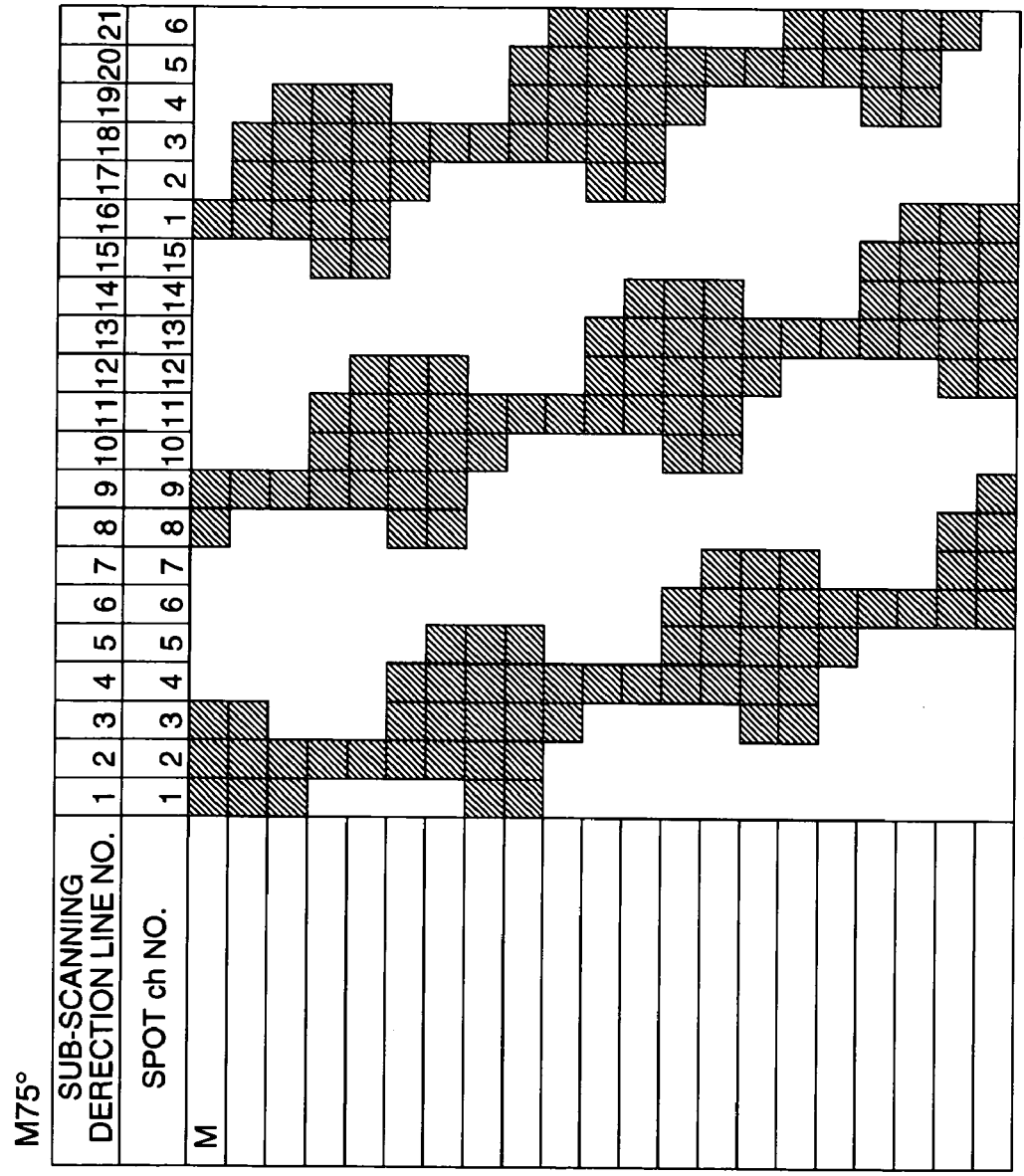
FIG. 7 shows schematically how spots of M color are recorded at a screen angle of 75° by bringing the line number in the sub-scanning direction into agreement with the spot channel number.
Figure 8:
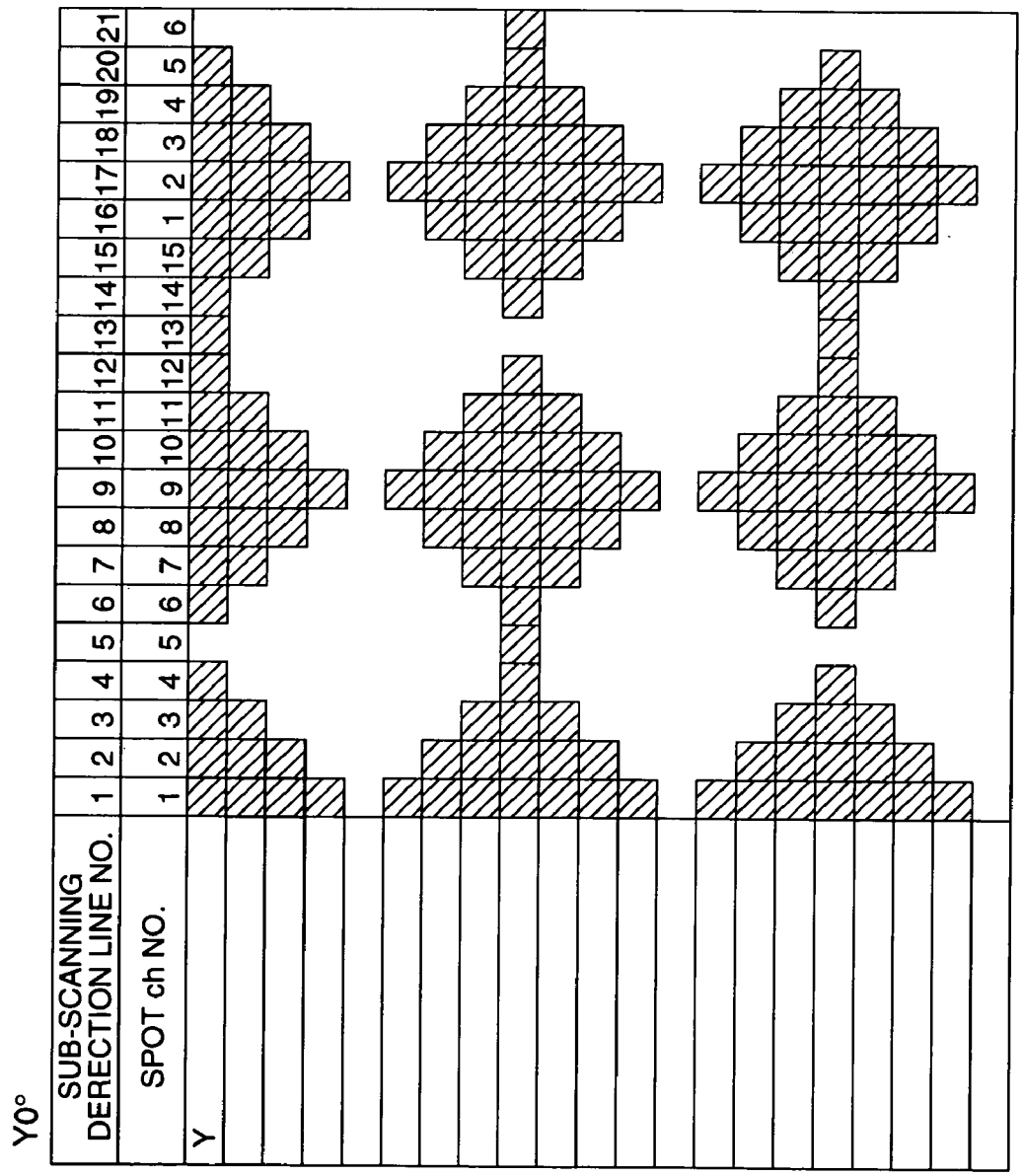
FIG. 8 shows schematically how spots of Y color are recorded at a screen angle of 0° by bringing the line number in the sub-scanning direction into agreement with the spot channel number.

FIGS. 2–4 by reference to which the foregoing description has been made do not show the arrangements of spots that are actually recorded but they are shown in simplified forms for better understanding of the key concept of the invention. In practice, spots of different colors are recorded at screen angles that are predetermined for the respective colors. Take, for example, K color and this is recorded at a screen angle of 45° as shown in FIG. 5; C color is recorded at a screen angle of 15° as shown in FIG. 6; M color is recorded at a screen angle of 75° as shown in FIG. 7; and Y color is recorded at a screen angle of 0° as shown in FIG. 8.

Figure 9:
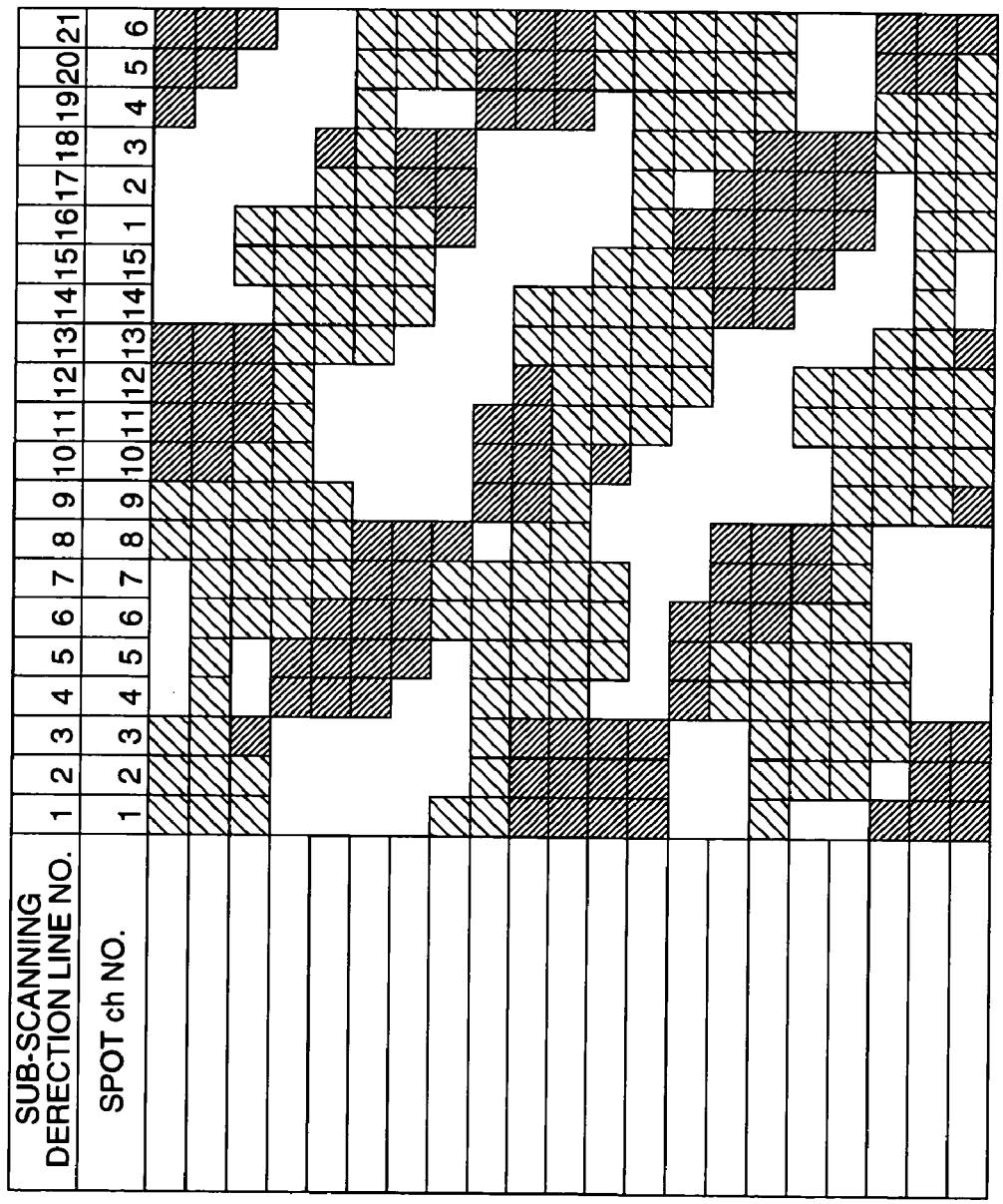
FIG. 9 shows schematically the result of simple superposition of the records of K and C colors shown in FIGS. 5 and 6, respectively.
Figure 10:
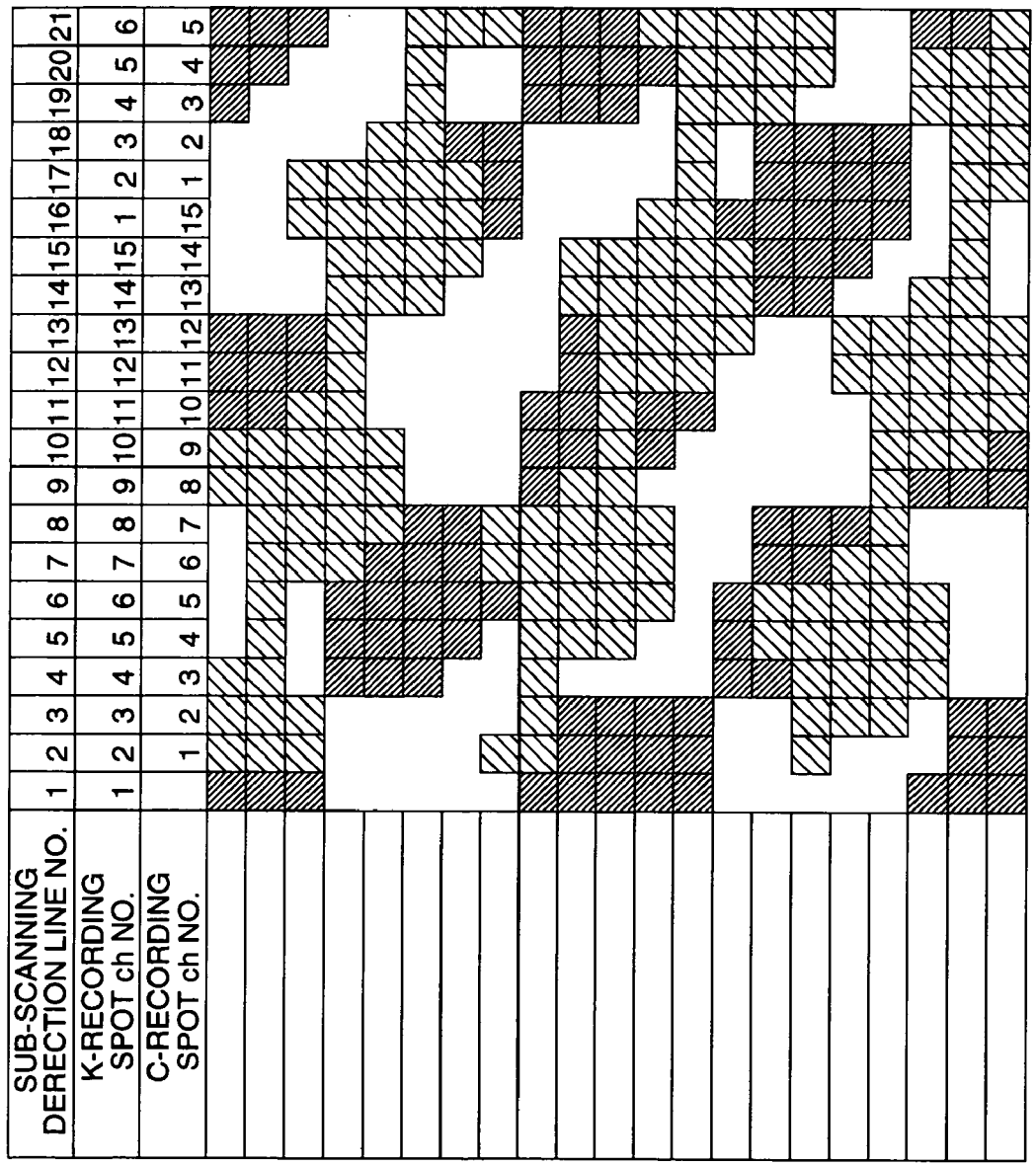
FIG. 10 shows schematically the result of recording with the start position for recording C color (see FIG. 6) being offset from K color (see FIG. 5) by one spot upstream in the sub-scanning direction.
Figure 11:
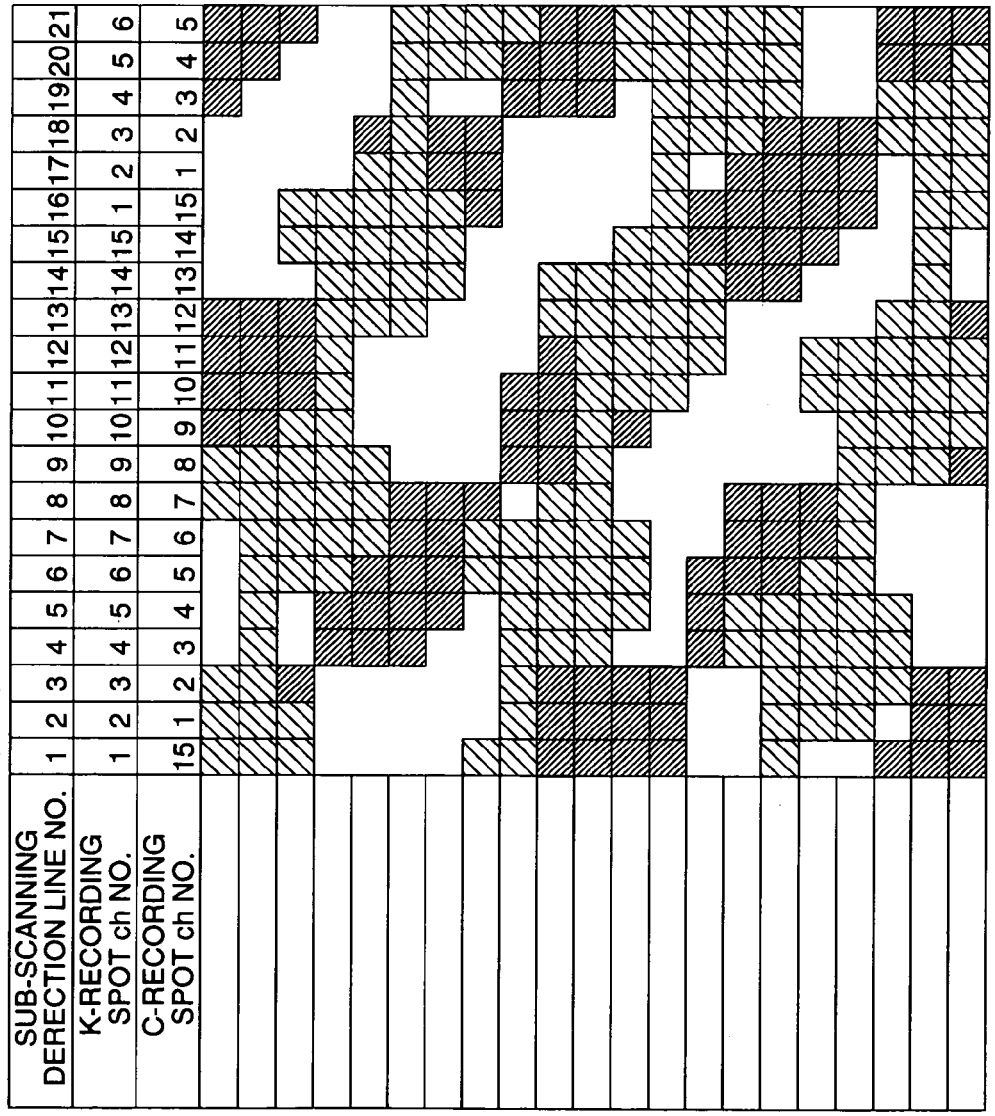
FIG. 11 shows schematically the result of recording with the start position for recording C color (see FIG. 6) being offset from K color (see FIG. 5) by one spot upstream in the sub-scanning direction and with the responsible spots being offset by the same amount in an opposite direction which is downstream in the sub-scanning direction.
Figure 12:
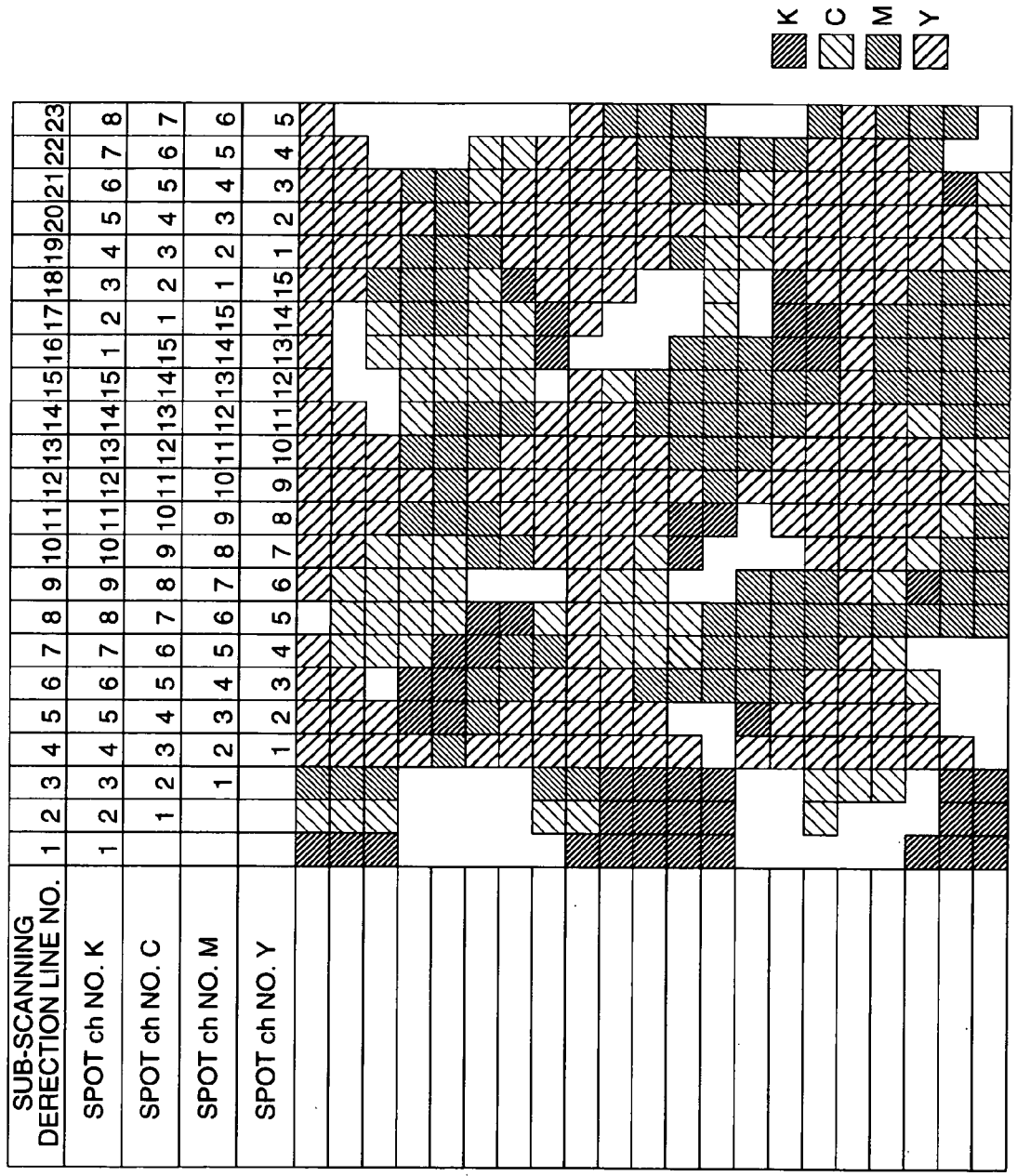
FIG. 12 shows schematically the result of recording with the start position for recording C color (see FIG. 6) being offset from K color (see FIG. 5) by one spot downstream in the sub-scanning direction, with the start position for recording M color (see FIG. 7) being offset by two spots, and with the start position for recording Y color (see FIG. 8) being offset by three spots.

Therefore, in the actual case of recording, if the spots of K color shown in FIG. 5 and the spots of C color shown in FIG. 6 are simply placed one on the other, the recorded image pattern will look as shown in FIG. 9. If the start position for recording C color is offset from K color by one spot upstream in the sub-scanning direction, the recorded image pattern will look as shown in FIG. 10. If the start position for recording C color is offset from K color by one spot upstream in the sub-scanning direction and the responsible spots are offset by the same amount in an opposite direction which is downstream in the sub-scanning direction, the recorded image pattern will look as shown in FIG. 11. If the start position for recording C color is offset from K color by one spot downstream in the sub-scanning direction, with the start position for recording M color (see FIG. 7) being offset by two spots and the start position for recording Y color (see FIG. 8) being offset by three spots, the recorded image pattern will look as shown in FIG. 12.

In the foregoing three embodiments, the two-dimensional array of spots consists of 5 rows and 3 columns. This is not the sole case for the recording method and apparatus of the invention and they are applicable to all arrangements of recording elements in which the number of rows is an integer between 1 and 10,000 or the number of columns is an integer between 1 and 10,000.

Figure 13:
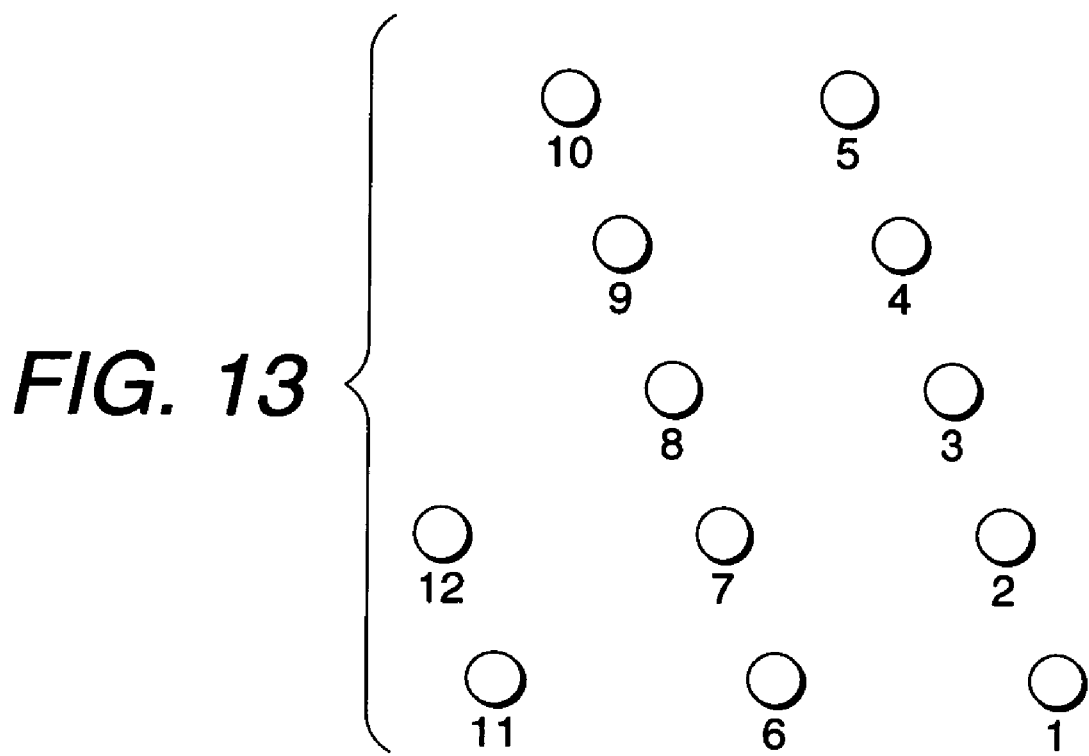
FIG. 13 illustrates the positions of effective spots in a two-dimensional array of a given number of spots.

In order to adjust the number of spots in a two-dimensional pattern, the first spot to be rendered ineffective is the one that is located the most upstream or downstream in the sub-scanning direction and which is at the end where recording is to start or finish and the adjacent spots are sequentially rendered ineffective. Take, for example, the case of adjusting the number of spots to an even number (say, 12 channels) for a certain reason (e.g. in order to provide ease in signal processing). If the spots are of a basic arrangement (5 rows×3 columns), the last three spots that are most downstream in the sub-scanning direction and which are at and near the end where recording is to finish are rendered ineffective, as shown in FIG. 13. In this case, the channels at both ends are channels 1 and 12 and the preceding channels are channels 1, 6 and 11.

Figure 14:
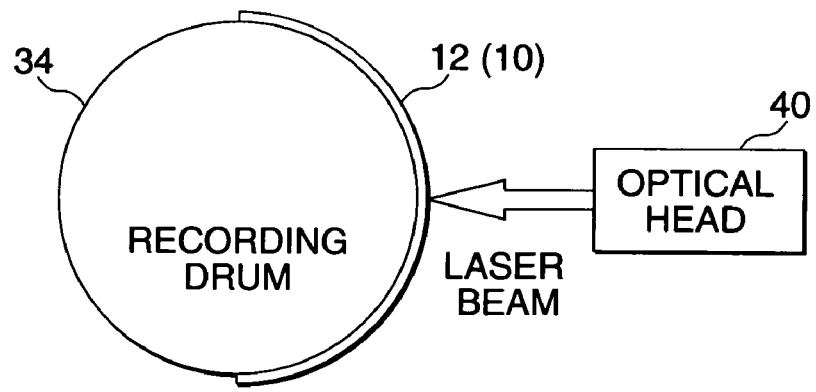
FIG. 14A illustrates the outer drum system that can be used in implementing the recording method according to the first aspect of the invention.
FIGS. 14B and 14C illustrate the inner drum system that can be used in implementing the recording method according to the first aspect of the invention.
Figure 14:
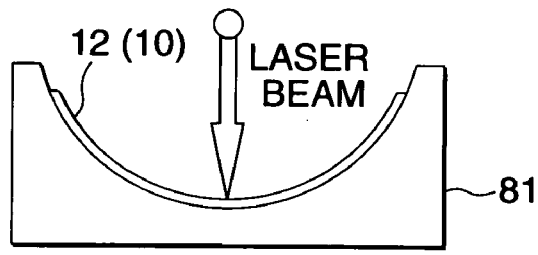
Figure 14:
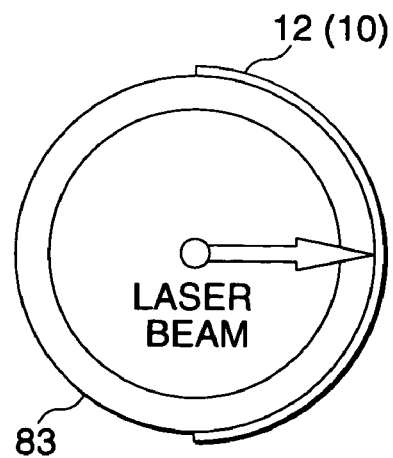

The recording apparatus used to implement the recording method according to the three embodiments described above is of a so-called "outer drum" type which is typically shown in FIG. 14A and this may be substituted by an "inner drum" type, two examples of which are shown in FIGS. 14B and 14C.

A recording apparatus of the inner drum type shown in FIG. 14B has a recording drum 81 with a concave inner surface that is fitted with a colorant sheet 10 and an image-receiving sheet 12. To recording information, laser beams are applied to the recording media 10 and 12 from the center of curvature of the drum 81.

A recording apparatus of the inner drum type shown in FIG. 14C has a generally cylindrical transparent recording drum 83 having a colorant sheet 10 and an image-receiving sheet 12 mounted on its outer circumference. To recording information, laser beams are applied toward the recording media 10 and 12 from the point which generally coincides with the center of the drum 83.

Figure 15:
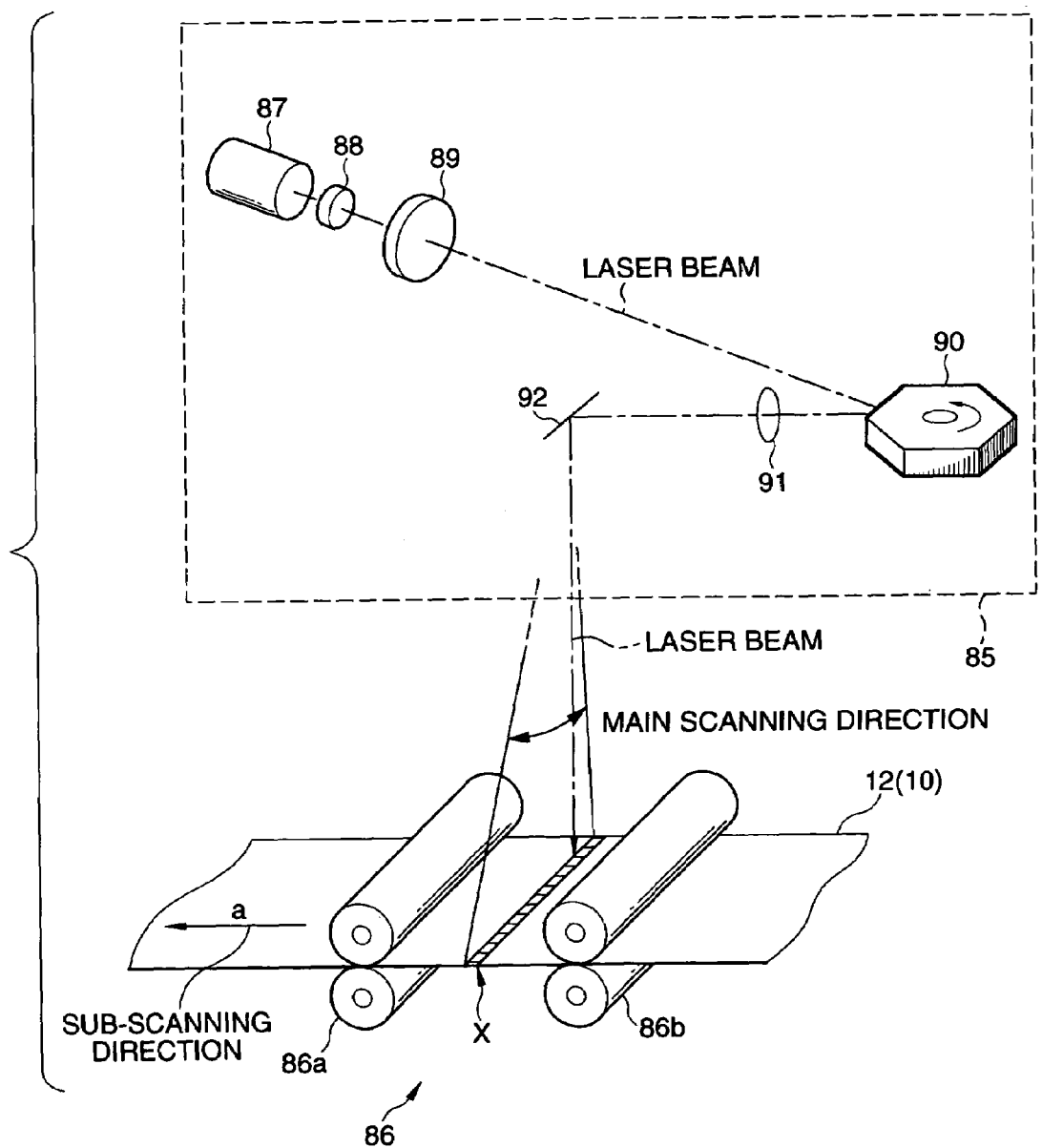
FIG. 15 shows the layout of the essential part of another recording apparatus that can implement the recording method according to the first aspect of the invention.
Figure 16:
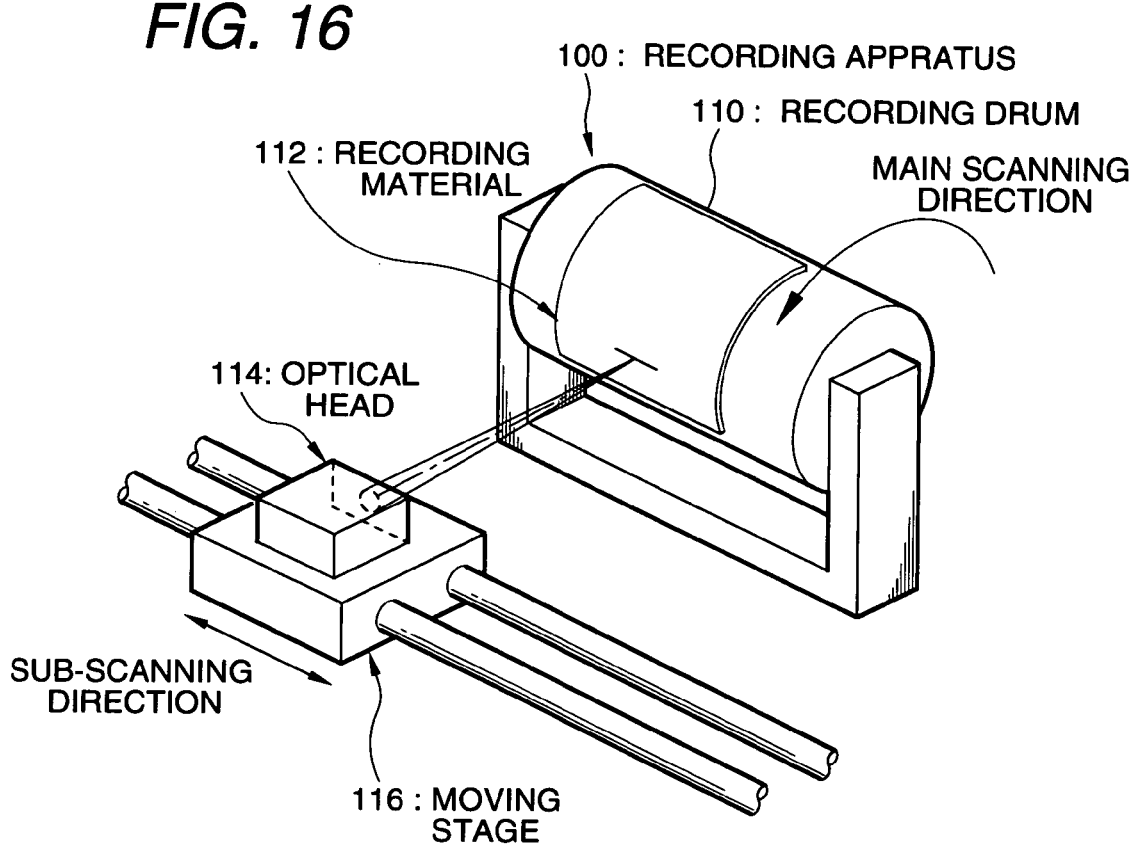
FIG. 16 is a perspective view showing diagrammatically a conventional recording apparatus having a recording head and a rotating recording drum.
Figure 17:
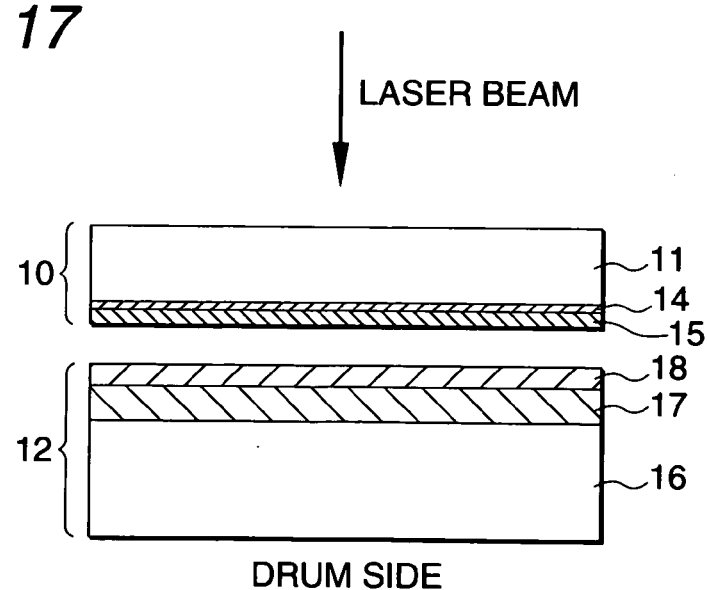
FIG. 17 is a cross-sectional view showing the arrangement of layers in the colorant sheet and the image-receiving sheet for use in the recording apparatus of FIG. 16.
Figure 18:
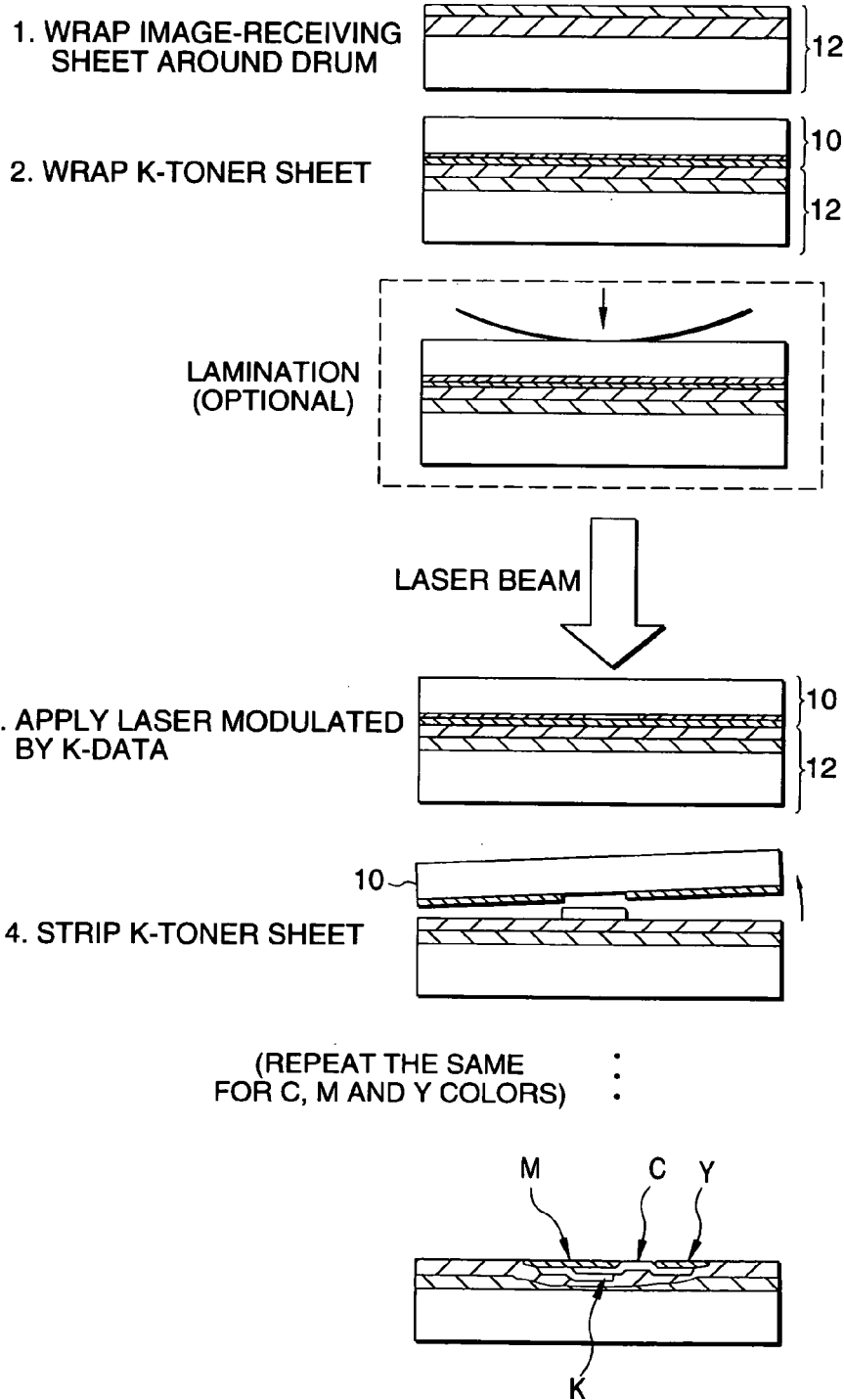
FIG. 18 shows in conceptual form the steps in the process of recording with the recording apparatus of FIG. 16.

Another example of the recording apparatus is shown in FIG. 15, in which an exposing unit 85 scans laser beams in the main scanning direction as recording media 10 and 12 are transported in the sub-scanning direction by means of a transport mechanism 86 consisting of two roller pairs 86a and 86b.

The exposing unit 85 has a light source 87 that emits laser beams having narrow-band wavelengths as appropriate for the spectral sensitivity characteristics of the recording media 10 and 12, a first cylindrical lens 88, a second cylindrical lens 89, a polygonal mirror 90 which is an optical deflector, an fθ lens 91 and a bend-down mirror 92. The laser beams modulated in accordance with the image to be recorded are deflected in the main scanning direction by the exposing unit 85 so that they change direction to be incident in a predetermined recording position X.

Although not shown, various members that are provided in known optical beam scanners may be added to the exposing unit 85 depending on the need and they include, for example, a collimator lens and a beam expander that shape the laser beams issuing from the light source, as well as tilt correcting optics and an optical path adjusting mirror.

In the foregoing embodiment, a laser head emitting laser light capable of fast and high-definition recording is shown as an example of the recording head and this may be replaced by a thermal head comprising a two-dimensional array of heat generating elements. The use of a thermal head reduces the cost of the recording apparatus and yet allows for high-definition recording. The thermal head is identical to the recording head in the above-mentioned recording apparatus except that the individual heat generating elements serve as the aforementioned recording elements and that they are adapted to be capable of contacting the whole surface of the recording medium across the width.

The foregoing embodiment uses the recording head 40 having a multiple of LDs arranged in a two-dimensional pattern. The recording method of the invention may employ other kinds of recording head such as a one-dimensional optical shutter type, an LD linear array type having a multiple of LD emitting surfaces arranged in a row, and an LED array type having a multiple of LEDs (light-emitting diodes) arranged in a matrix. Alternatively, a one-dimensional array of light sources may be stacked in layers to form a two-dimensional array of spots.

A word must be said here about the direction in which the recording medium makes relative movements to the recording head during main scan. If the recording drum scans (rotates) from below the recording head upward as shown in FIG. 1, the foregoing description may be read as it is. In other cases such as where the recording drum rotates in an opposite direction so that the recording medium scans (rotates) from above the recording head downward or where the recording medium moves relative to the fixed recording head, the term "upstream" used in the foregoing description should be rewritten as "downstream" and vice versa. However, if the foregoing description is read as the above-mentioned alternative cases, it can equally apply to the situation in which the recording medium makes relative movements to the recording head in opposite direction. Therefore, the terms "upstream" and "downstream" as used herein are independent of the direction in which the recording medium makes relative movements to the recording head and the bottom side and the light side of FIG. 19 shall be referred to as "upstream" whereas the top side and the left side as "downstream".

As described above in detail, according to the recording method of the invention, the start position for recording by the recording head in the sub-scanning direction is offset either upstream or downstream in the sub-scanning direction, so that different spot channels are used in the same place (the same recording line in the sub-scanning direction) to record a plurality of colors. As a result, the characteristics inherent in channels will not be exaggerated but will become less visible as image defects, thus reducing the image unevenness which is dependent on the characteristics of channel arrangement.

What is claimed is:

1. A recording method comprising:
    providing a recording head which projects a plurality of recording spots on a recording medium; and
    recording, by said projected recording spots, a plurality of colors on the recording medium in both a main scanning direction and a sub-scanning direction perpendicular to said main scanning direction,
    wherein said recording step includes offsetting, either upstream or downstream, in the sub-scanning direction, a start position for recording one of at least two colors relative to a start position for recording other one of said at least two colors in the sub-scanning direction, and further wherein an amount of the offsets is within the range from one spot to the number defined such that total number of spots in the sub-scanning direction subtracts one spot.

2. A recording method comprising:

providing a recording head which projects a plurality of recording spots on a recording medium; and recording, by said projected recording spots, a plurality of colors on the recording medium in both a main scanning direction and a sub-scanning direction perpendicular to said main scanning direction, wherein said plurality of colors to be recorded are four colors black, cyan, magenta, and yellow, wherein said step of recording includes offsetting, either upstream or downstream in the sub-scanning direction, a start position of each color, for recording by said recording head in the sub-scanning direction, the start position of one of said plurality of colors being different from the start positions of another colors of said plurality of colors within a range from one spot to a number defined such that total number of spots in the sub-scanning direction subtracts one spot.

3. The recording method as claimed in 2, wherein a start position for recording a first one of said plurality of colors is offset substantially by one spot, a start position for recording a second one of said plurality of colors is offset substantially by two spots, and a start position for recording a third one of said plurality of colors is offset substantially by three spots.

4. The recording method as claimed in any one of claims 1 to 3, wherein said step of recording includes offsetting the projected spots, in correspondence with image data to be projected in the sub-scanning direction, by same amount in an opposite direction of the respective start position which is offset either downstream or upstream in the sub-scanning direction.

5. A recording apparatus comprising:

a recording head having a plurality of recording elements arranged in a two-dimensional pattern having both a main scanning direction and a sub-scanning direction perpendicular to said main scanning direction, said recording head being configured to record a plurality of colors on a recording medium with spots that key image information to the respective recording elements; and a controller which controls said recording head so as to implement the recording method recited in claim 1.

6. A recording apparatus comprising a recording head having a plurality of recording elements arranged in a two-dimensional pattern having both a main scanning direction and a sub-scanning direction perpendicular to said main scanning direction, said recording head being configured to record a plurality of colors on a recording medium with spots that key image information to the respective recording elements; and a controller which controls said recording head so as to implement the recording method recited in claim 2.

7. A recording apparatus comprising:

a recording head having a plurality of recording elements arranged in a two-dimensional pattern having both a main scanning direction and a sub-scanning direction perpendicular to said main scanning direction, said recording head being configured to record plurality of colors on a recording medium with spots that key image information to the respective recording elements; and a controller which controls said recording head so as to implement the recording method recited in claim 3.

8. A recording apparatus comprising:

a recording head having a plurality of recording elements arranged in a two-dimensional pattern having both a main scanning direction and a sub-scanning direction perpendicular to said main scanning direction, said recording head being configured to record a plurality of colors on a recording medium with spots that key image information to the respective recording elements; and a controller which controls said recording head so as to implement the recording method recited in claim 4.

9. The method of claim 1, wherein a start position for one of the plurality of colors is offset relative to each of the other plurality of colors.

10. The method of claim 9, wherein the offset between colors is less than 50 micrometers.

11. The method of claim 1, said recording head comprising a laser printer head.

12. The method of claim 1, said recording head comprising at least one of a thermal head and a laser printer head.

13. The method of claim 1, said recording head including multiple spot channels recording plural colors in a same place.

14. The method of claim 1, wherein the two colors are respectively formed by a first set of spots and a second set of spots arranged in a common pattern, wherein the start positions of the two colors are formed by different positions of the first and second sets of spots arranged in the common pattern.

15. The method of claim 1, wherein the at least two colors are formed by the same recording head.

* * * * *